US012438627B2

(12) United States Patent
Wang et al.

(10) Patent No.: US 12,438,627 B2
(45) Date of Patent: Oct. 7, 2025

(54) ULTRA-WIDEBAND ENABLED ONE-FOR-ALL SMART REMOTE

(71) Applicant: SAMSUNG ELECTRONICS CO., LTD., Suwon-si (KR)

(72) Inventors: Ju Wang, Brossard (CA); Xue Liu, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 440 days.

(21) Appl. No.: 17/965,360

(22) Filed: Oct. 13, 2022

(65) Prior Publication Data
US 2024/0129048 A1 Apr. 18, 2024

(51) Int. Cl.
H04B 17/318 (2015.01)
H04W 72/30 (2023.01)

(52) U.S. Cl.
CPC .......... *H04B 17/318* (2015.01); *H04W 72/30* (2023.01)

(58) Field of Classification Search
CPC .... H04B 17/318; H04W 72/30; H04W 72/40; G08C 2201/20; G08C 2201/71; H04L 12/281
See application file for complete search history.

(56) References Cited

U.S. PATENT DOCUMENTS

| 10,667,312 | B2 | 5/2020 | Yoon et al. | |
| 10,796,564 | B2 | 10/2020 | Kim et al. | |
| 11,228,378 | B2* | 1/2022 | Hausl | H04B 17/27 |
| 2014/0125464 | A1* | 5/2014 | Chen | G08C 19/00 340/12.54 |
| 2018/0165951 | A1* | 6/2018 | Kim | G06F 3/167 |
| 2021/0088645 | A1* | 3/2021 | Casamassima | H04B 1/7163 |
| 2022/0114882 | A1* | 4/2022 | Norris | H04W 76/10 |
| 2024/0153375 | A1* | 5/2024 | Dong | H04S 7/302 |

OTHER PUBLICATIONS

Moustafa Abbas, "WiDeep: WiFi-based Accurate and Robust Indoor Localization System using Deep Learning," Mar. 2019, IEEE International Conference on Pervasive Computing and Communications. (Year: 2019).*

\* cited by examiner

*Primary Examiner* — Charles C Jiang
*Assistant Examiner* — Ryan C Kavleski
(74) *Attorney, Agent, or Firm* — Sughrue Mion, PLLC

(57) ABSTRACT

The present disclosure provides methods, apparatuses, and computer-readable mediums for performing ultra-wideband (UWB) remote control. In some embodiments, the method includes broadcasting an initial control request. The method further includes receiving, from one or more remote devices, at least one reply message comprising identification information and power spectrum information. The method further includes estimating, for each of the one or more remote devices, an angle indicating a pointing direction to that remote device relative to the remote control device. The method further includes determining a selected remote device that is being pointed at by the remote control device. The method further includes sending, to the one or more remote devices, a control signal comprising the identification information of the selected remote device and a control message indicating an action to be performed by the selected remote device.

18 Claims, 13 Drawing Sheets

ULTRA-WIDEBAND ENABLED ONE-FOR-ALL SMART REMOTE

BACKGROUND

1. Field

The present disclosure relates generally to ultra-wideband (UWB) communications, and more particularly to methods and apparatuses for performing UWB remote control between UWB-enabled devices.

2. Description of Related Art

Related remote control devices may refer to electronic devices that may wirelessly control another device (e.g., a remote device) from a distance (e.g., remotely). These remote control devices may provide convenience features to users. For example, a user may, from the comfort of a sofa, a reclining chair, a bed, or another sitting and/or lying position, be able to enjoy watching a movie, a television program, or a video clip while remotely controlling one or more remote devices without having to get up from their position to physically control the remote devices. That is, the user may use remote control devices to control the remote devices to change television channels or video sources being displayed on a television or video screen, to adjust a sound volume of audio emanating from speakers, to turn on/off and/or dim lighting throughout the user's home, to control temperature settings of heating/cooling systems, and the like. In another example, a user may, without standing up from a chair in a workplace conference room, adjust lighting and/or volume levels, blind/curtain configurations, turn projectors on/off, lower or raise projection screens, and the like.

Related remote control devices may be typically designed to control only a specific remote device. For example, a remote control device may be configured to control only a specific type of remote device (e.g., television, set-top box (STB), air conditioner, ceiling fan) and/or a specific brand and/or model of that device type. That is, a remote control device designed for a particular television model of a first manufacturer may not be able to control another television model from the first manufacturer, a television from a second manufacturer, and/or another type of remote device (e.g., STB). As a result, users may be required to choose between multiple remote control devices to perform operations that are part of a same simple activity, thus negatively impacting user experience. For example, a user watching television may need to use a first remote control device to select a video source (e.g., live television, recorded programs, streamed video), a second remote control device to change live television channels, and a third remote control device to adjust the sound volume. Consequently, the user may be required to store and/or keep within reach at least three remote control devices while watching television, which may further negatively impact user experience.

In an attempt to alleviate some of these deficiencies, related one-for-all remote control devices may be designed to control multiple remote devices. That is, a single one-for-all remote control device may be able to control multiple types of remote devices, multiple models of remote devices, and/or remote devices from multiple manufacturers. For example, a user may select video sources, change television channels, and adjust volume using a single one-for-all remote control device. However, related one-for-all remote control devices may require frequent pairing and/or learning processes to configure the remote control device to control different remote devices and/or to switch between pre-configured remote devices. The need for pairing remote devices and/or manually switching between the remote devices may reduce the user experience.

The related one-for-all remote control devices may wirelessly communicate with the remote devices using one or more wireless communication technologies, such as, but not limited to, infrared, Bluetooth, Bluetooth Low Energy (BLE), and Institute of Electrical and Electronics Engineers (IEEE) 802.11x (e.g., Wi-Fi). Ultra-wideband (UWB) may refer to a radio technology that uses a relatively low energy level across a wide frequency bandwidth (e.g., greater than 500 MHz) that may be used for data communication, mobile telephony, and/or localization (e.g., ranging, real-time location systems), among other applications. Due to these benefits and capabilities, UWB-enabled devices may include wireless computing devices (e.g., a smartphone, a personal digital assistant (PDA)), a laptop, a tablet, a smart device, a wearable device, a smart tag, or any other similar functioning device).

Thus, there exists a need for further improvements to one-for-all remote control devices. Improvements are presented herein. These improvements may also be applicable to other remote control technologies and/or wireless communication technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for performing ultra-wideband (UWB) remote control are disclosed by the present disclosure.

According to an aspect of the present disclosure, a method of UWB remote control to be performed by a remote control device is provided. The method includes broadcasting an initial control request. The method further includes receiving, from one or more remote devices in response to the initial control request, at least one reply message including identification information and power spectrum information of a corresponding remote device of the one or more remote devices. The power spectrum information has been generated based on at least the initial control request. The method further includes estimating, using a neural network-based algorithm, for each remote device of the one or more remote devices an angle indicating a pointing direction to that remote device relative to the remote control device, based at least on the power spectrum information. The method further includes determining, based at least on the angle of each remote device of the one or more remote devices, a selected remote device that is being pointed at by the remote control device. The method further includes sending, to the one or more remote devices, a control signal including the identification information of the selected remote device and a control message indicating an action to be performed by the selected remote device.

In some embodiments, the receiving of the at least one reply message may include receiving, from the one or more remote devices in response to the initial control request, the at least one reply message. The remote control device may not have performed a pairing procedure with the one or more remote devices.

In some embodiments, the method may further include detecting that a change in a pointing orientation of the remote control device exceeds a predetermined threshold. In such embodiments, the broadcasting of the initial control request may include broadcasting, in response to the detecting that the change in the pointing orientation of the remote control device exceeds the predetermined threshold, the initial control request.

In some embodiments, the method may further include obtaining a user input indicating the action to be performed by the selected remote device. In such embodiments, the broadcasting of the initial control request may include broadcasting, in response to the obtaining of the user input, the initial control request.

In some embodiments, the method may further include decoding, for each remote device of the one or more remote devices, respective signal phases of the at least one reply message. In such embodiments, the method may further include generating coarse-grained angle estimates for each remote device of the one or more remote devices, based at least on the respective signal phases. In such embodiments, the estimating of the angle may include estimating, using the neural network-based algorithm, for each remote device of the one or more remote devices the angle indicating the pointing direction to that remote device relative to the remote control device, based at least on the power spectrum information and the coarse-grained angle estimates.

In some embodiments, the method may further include displaying a control user interface (UI) corresponding to the selected remote device.

In some embodiments, the sending of the control signal may include obtaining, via the control UI, a user input indicating the action to be performed by the selected remote device.

In some embodiments, the method may further include detecting that a change in a pointing orientation of the remote control device exceeds a predetermined threshold. In such embodiments the method may further include changing display of the control UI to another control UI corresponding to another selected remote device, in response to the change in the pointing orientation of the remote control device causing the another selected remote device to be determined as the selected remote device.

In some embodiments, the estimating of the angle may include estimating, using the neural network-based algorithm, for each remote device of the one or more remote devices the angle indicating the pointing direction to that remote device in a two dimensional (2D) space or a three dimensional (3D) space relative to the remote control device, based at least on the power spectrum information.

In some embodiments, the method may further include transmitting, to a particular remote device, a short preamble UWB signal at a predetermined power level, which may cause the particular remote device to calculate an environment-related parameter based on at least the short preamble UWB signal.

According to an aspect of the present disclosure, an apparatus for UWB remote control to be performed by a remote control device is provided. The apparatus includes a memory storage storing computer-executable instructions, and a processor communicatively coupled to the memory storage. The processor is configured to execute the computer-executable instructions and cause the apparatus to broadcast an initial control request. The processor further causes the apparatus to receive, from one or more remote devices in response to the initial control request, at least one reply message that includes identification information and power spectrum information of a corresponding remote device of the one or more remote devices. The power spectrum information has been generated based on at least the initial control request. The processor further causes the apparatus to estimate, using a neural network-based algorithm, for each remote device of the one or more remote devices an angle that indicates a pointing direction to that remote device relative to the remote control device, based at least on the power spectrum information. The processor further causes the apparatus to determine, based at least on the angle of each remote device of the one or more remote devices, a selected remote device that is being pointed at by the remote control device. The processor further causes the apparatus to send, to the one or more remote devices, a control signal that includes the identification information of the selected remote device and a control message that indicates an action to be performed by the selected remote device.

In some embodiments, the processor may be further configured to execute further computer-executable instructions and may further cause the apparatus to receive, from the one or more remote devices in response to the initial control request, the at least one reply message. In such embodiments, the remote control device may not have performed a pairing procedure with the one or more remote devices.

In some embodiments, the processor may be further configured to execute further computer-executable instructions and may further cause the apparatus to detect that a change in a pointing orientation of the remote control device exceeds a predetermined threshold. In such embodiments, the broadcast of the initial control request may include to broadcast, in response to detection that the change in the pointing orientation of the remote control device exceeds the predetermined threshold, the initial control request.

In some embodiments, the processor may be further configured to execute further computer-executable instructions and may further cause the apparatus to obtain a user input that may indicate the action to be performed by the selected remote device. In such embodiments, the broadcast of the initial control request may include to broadcast, in response to obtaining of the user input, the initial control request.

In some embodiments, the processor may be further configured to execute further computer-executable instructions and may further cause the apparatus to decode, for each remote device of the one or more remote devices, respective signal phases of the at least one reply message. In such embodiments, the processor may further cause the apparatus to generate coarse-grained angle estimates for each remote device of the one or more remote devices, based at least on the respective signal phases. In such embodiments, the estimation of the angle may include to estimate, using the neural network-based algorithm, for each remote device of the one or more remote devices the angle indicating the pointing direction to that remote device relative to the remote control device, based at least on the power spectrum information and the coarse-grained angle estimates.

In some embodiments, the processor may be further configured to execute further computer-executable instructions and may further cause the apparatus to display a control UI corresponding to the selected remote device.

In some embodiments, the processor may be further configured to execute further computer-executable instructions and may further cause the apparatus to obtain, via the control UI, a user input indicating the action to be performed by the selected remote device.

In some embodiments, the processor may be further configured to execute further computer-executable instructions and may further cause the apparatus to detect that a change in a pointing orientation of the remote control device exceeds a predetermined threshold. In such embodiments the processor may further cause the apparatus to change display of the control UI to another control UI corresponding to another selected remote device, in response to the change in the pointing orientation of the remote control device having caused the another selected remote device to be determined as the selected remote device.

In some embodiments, the processor may be further configured to execute further computer-executable instructions and may further cause the apparatus to estimate, using the neural network-based algorithm, for each remote device of the one or more remote devices the angle that indicates the pointing direction to that remote device in a 2D space or a 3D space relative to the remote control device, based at least on the power spectrum information.

In some embodiments, the processor may be further configured to execute further computer-executable instructions and may further cause the apparatus to transmit, to a particular remote device, a short preamble UWB signal at a predetermined power level, which may cause the particular remote device to calculate an environment-related parameter based on at least the short preamble UWB signal.

According to an aspect of the present disclosure, a non-transitory computer-readable storage medium storing computer-executable instructions for performing UWB remote control by a remote control device is provided. The computer-executable instructions are configured, when executed by one or more processors of the remote control device, to cause the remote control device to broadcast an initial control request. The computer-executable instructions are further configured to further cause the remote control device to receive, from one or more remote devices in response to the initial control request, at least one reply message that includes identification information and power spectrum information of a corresponding remote device of the one or more remote devices. The power spectrum information has been generated based on at least the initial control request. The computer-executable instructions are further configured to further cause the remote control device to estimate, using a neural network-based algorithm, for each remote device of the one or more remote devices an angle that indicates a pointing direction to that remote device relative to the remote control device, based at least on the power spectrum information. The computer-executable instructions are further configured to further cause the remote control device to determine, based at least on the angle of each remote device of the one or more remote devices, a selected remote device that is being pointed at by the remote control device. The computer-executable instructions are further configured to further cause the remote control device to send, to the one or more remote devices, a control signal that includes the identification information of the selected remote device and a control message that indicates an action to be performed by the selected remote device.

According to an aspect of the present disclosure, a method of UWB remote control to be performed by a remote device is provided. The method includes receiving, from a remote control device, an initial control request. The method further includes generating power spectrum information based on at least the initial control request. The method further includes sending, to the remote control device, a reply message including identification information of the remote device and the power spectrum information. The method further includes performing an action indicated by a control signal received from the remote control device. The control signal includes the identification information of the remote device and a control message indicating the action to be performed by the remote device.

In some embodiments, the method may further include receiving, from the remote control device, a short preamble UWB signal at a predetermined power level. In such embodiments, the method may further include calculating an environment-related parameter based on at least the short preamble UWB signal. In such embodiments, the generating of the power spectrum information may include generating the power spectrum information based on at least the initial control request and the environment-related parameter.

According to an aspect of the present disclosure, an apparatus for UWB remote control to be performed by a remote device is provided. The apparatus includes a memory storage storing computer-executable instructions, and a processor communicatively coupled to the memory storage. The processor is configured to execute the computer-executable instructions and cause the apparatus to receive, from a remote control device, an initial control request. The processor further causes the apparatus to generate power spectrum information based on at least the initial control request. The processor further causes the apparatus to send, to the remote control device, a reply message that includes identification information of the remote device and the power spectrum information. The processor further causes the apparatus to perform an action indicated by a control signal received from the remote control device. The control signal includes the identification information of the remote device and a control message that indicates the action to be performed by the remote device.

In some embodiments, the processor may be further configured to execute further computer-executable instructions and may further cause the apparatus to receive, from the remote control device, a short preamble UWB signal at a predetermined power level. In such embodiments, the processor may be further configured to execute further computer-executable instructions and may further cause the apparatus to calculate an environment-related parameter based on at least the short preamble UWB signal. In such embodiments, the generation of the power spectrum information may include to generate the power spectrum information based on at least the initial control request and the environment-related parameter.

According to an aspect of the present disclosure, a non-transitory computer-readable storage medium storing computer-executable instructions for performing UWB remote control by a remote device is provided. The computer-executable instructions are configured, when executed by one or more processors of the remote device, to cause the remote device to receive, from a remote control device, an initial control request. The computer-executable instructions are further configured to further cause the remote device to generate power spectrum information based on at least the initial control request. The computer-executable instructions are further configured to further cause the remote device to send, to the remote control device, a reply message that includes identification information of the remote device and the power spectrum information. The computer-executable instructions are further configured to further cause the remote device to perform an action indicated by a control signal received from the remote control device. The control signal includes the identification information of the remote device and a control message that indicates the action to be performed by the remote device.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

As a general introduction to the subject matter described in more detail below, aspects described herein are directed towards systems, devices, and methods for performing ultra-wideband (UWB) remote control. Aspects described herein may be used to provide for a UWB-enabled one-for-all remote control device to control different devices without the need of device pairing. Alternatively or additionally, the UWB-enabled one-for-all remote control device may automatically control a remote device that is pointed to by the remote control device. In some aspects, the UWB-enabled one-for-all remote control device may select the remote device based on estimated angles indicating pointing directions to the remote devices relative to the remote control device.

Related one-for-all remote control devices may be designed to control multiple remote devices. However, the related one-for-all remote control devices may require frequent pairing and/or learning processes to configure the remote control device to control different remote devices and/or to switch between pre-configured remote devices. The need for pairing remote devices and/or manually switching between the remote devices may result in a reduced user experience.

Aspects presented herein provide for multiple manners for performing UWB remote control that may seamlessly switch control between remote devices. The UWB remote control may provide for UWB-enabled one-for-all remote control devices that control different devices without the need of device pairing and/or that automatically control a remote device that is pointed to by the remote control device. Thus, potentially providing an improved user experience when compared to related one-for-all remote control devices.

As noted above, certain embodiments are discussed herein that relate to performing UWB remote control. Before discussing these concepts in further detail, however, an example of a computing device that may be used in implementing and/or otherwise providing various aspects of the present disclosure will first be discussed with respect to FIG. 1.

Figure 1:
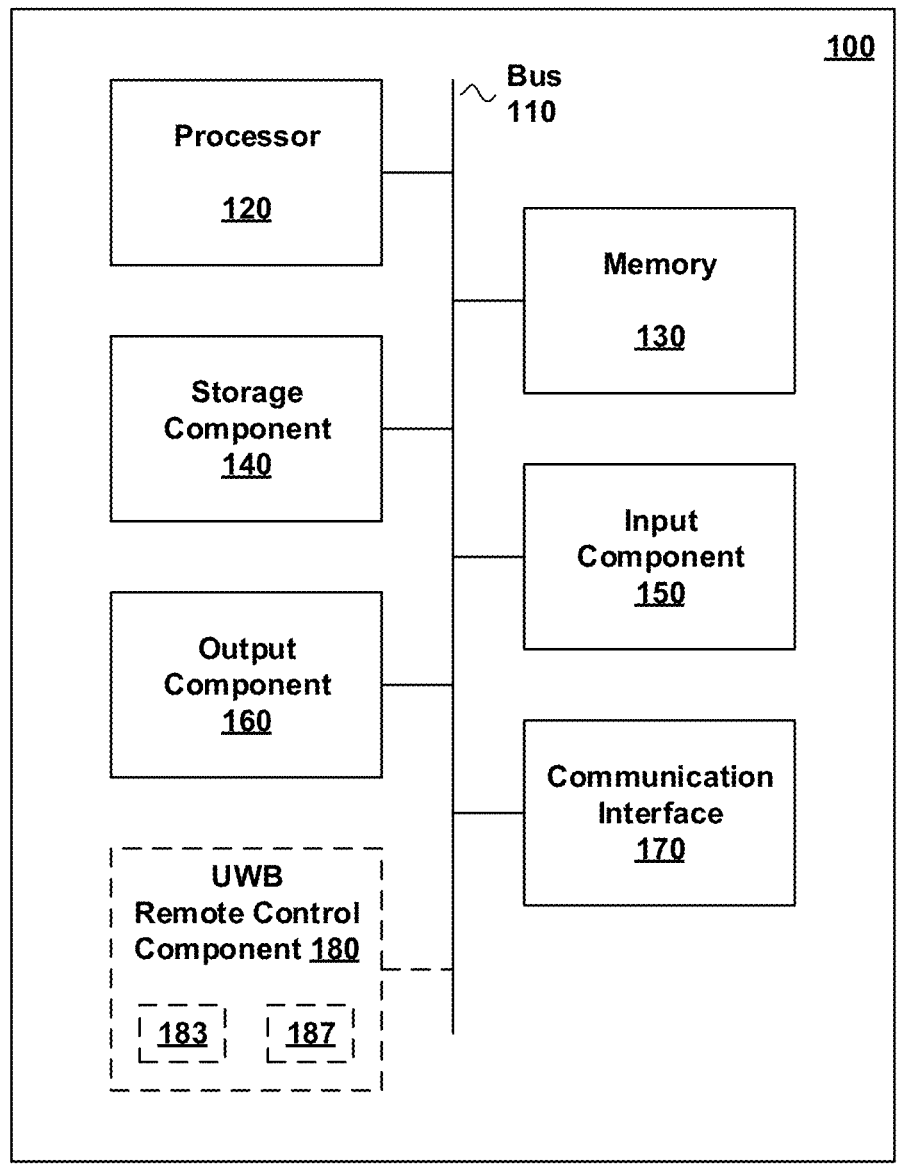
FIG. 1 depicts an example of a device that may be used in implementing one or more aspects of the present disclosure.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or comprise a desktop computer, a computer server, a mobile device (e.g., a laptop computer, a tablet computer, a smart phone, any other type of mobile computing device, etc.), and/or any other type of data processing device.

For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may comprise a set of components, such as a processor 120, a memory 130, a storage component 140, an input component 150, an output component 160, a communication interface 170, and an UWB remote control component 180. The UWB remote control component 180 may comprise a UWB remote control device component 183 and/or a UWB remote device component 187. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The present disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a neural processing unit (NPU), an AI-dedicated processor designed to have a hardware structure specified to process an AI model, a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the UWB remote control component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may comprise a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may comprise one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may comprise a sensor for sensing information (e.g., a global positioning system (GPS) component, an accelerometer, a gyroscope, an actuator, and the like).

The output component 160 of device 100 may comprise one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may comprise a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as UWB, FlashLinQ, WiMedia, Bluetooth, ZigBee, Wi-Fi, LTE, 5G, and the like. In other embodiments, the communication interface 170 may comprise an Ethernet interface, an optical interface, a coaxial interface, an infrared interface, a radio frequency (RF) interface, or the like.

In some embodiments, the device 100 may comprise the UWB remote control component 180 configured to perform UWB remote control. The UWB remote control component 180 may comprise the UWB remote control device component 183, which may be configured to broadcast an initial control request, receive at least one reply message, estimate angles indicating a pointing direction to remote devices, determine a selected remote device that is being pointed at by the remote control device, and send a control signal to the selected remote device. Alternatively or additionally, the UWB remote control component 180 may comprise the UWB remote device component 187, which may be configured to receive an initial control request, generate power spectrum information, send a reply message, and perform an action indicated by a control signal.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may comprise memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Although the following description may provide examples for communication in connection with UWB, the concepts described herein may be applicable to other similar areas, such as, infrared, Bluetooth, BLE, and/or Wi-Fi.

Having discussed an example of a device that may be used in providing and/or implementing various aspects of the present disclosure, a number of embodiments are now discussed in further detail. In particular, and as introduced above, some aspects of the present disclosure generally relate to performing UWB remote control. In the description below, various examples illustrate how seamless switching of control between remote devices may be provided without the need of pairing the remote devices, in accordance with one or more embodiments.

Figure 2:
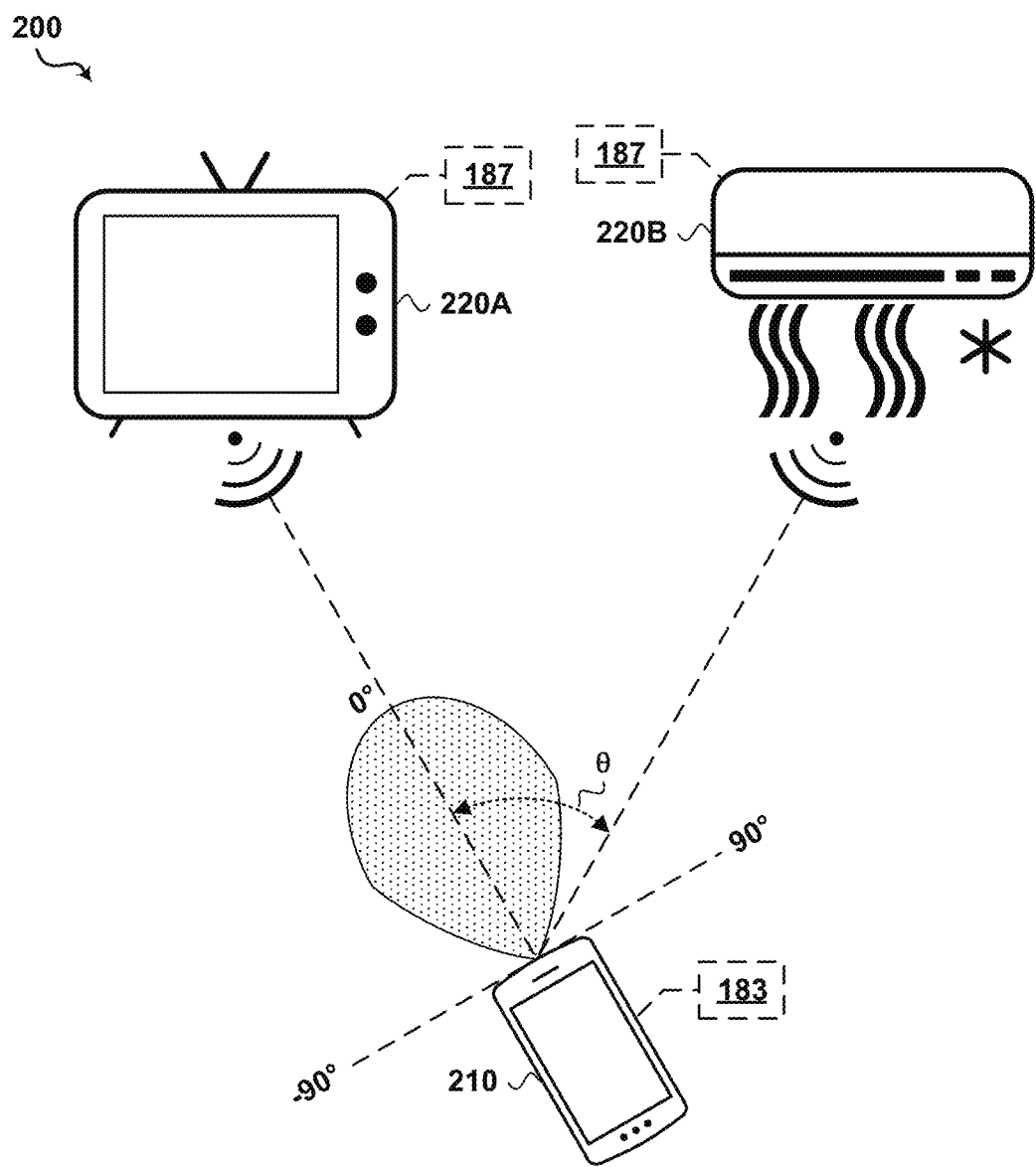
FIG. 2 illustrates an example of an ultra-wideband (UWB) remote control system, in accordance with various aspects of the present disclosure.

FIG. 2 illustrates an example of an UWB remote control system, in accordance with various aspects of the present disclosure. As shown in FIG. 2, the UWB remote control system 200 may comprise at least one UWB-enabled remote control device. For example, the UWB remote control system 200 may comprise at least one remote control device, such as remote control device 210. The UWB remote control system 200 may comprise one or more UWB-enabled remote devices. For example, the UWB remote control system 200 may comprise a plurality of remote devices (e.g., first remote device 220A and second remote device 220B, hereinafter "220" generally).

The remote control device 210 may be any type of wireless computing device (e.g., device 100 of FIG. 1) capable of transmitting and/or receiving UWB signals for controlling the remote devices 220. For example, the remote control device 210 may be implemented a device similar to the device 100 of FIG. 1 that may comprise the UWB remote control device component 183 of FIG. 1. Alternatively or additionally, the remote control device 210 may be a wireless computing device (e.g., a smartphone, a personal digital assistant (PDA)), a laptop, a tablet, a smart device, a wearable device, or any other similar functioning device) that is configured to perform UWB remote control (e.g., comprises the UWB remote control device component 183 of FIG. 1), and that may perform at least a portion of the UWB remote control operations described in the present disclosure.

The remote devices 220 may be any type of wireless computing devices (e.g., device 100 of FIG. 1) capable of transmitting and/or receiving UWB signals for being controlled by the remote control device 210. For example, the remote devices 220 may comprise a device similar to the device 100 of FIG. 1 that may comprise the UWB remote device component 187 of FIG. 1. Alternatively or additionally, the remote devices 220 may be devices that are configured to perform UWB remote control (e.g., comprises the UWB remote device component 187 of FIG. 1), and that may perform at least a portion of the UWB remote control operations described in the present disclosure.

In some embodiments, the plurality of remote devices 220 may comprise a homogeneous set of remote devices. That is, each remote device 220 of the plurality of remote devices 220 may be of a same type (e.g., television, air conditioner), may be of a same brand and/or manufacturer, and/or may be of a same model (e.g., version). In other embodiments, the plurality of remote devices 220 may comprise a heterogeneous set of remote devices. That is, the remote devices 220 may be of different types, different brands and/or manufacturers, and/or different models. The present disclosure is not limited in this regard.

Alternatively or additionally, the remote control devices may be further configured to perform additional functions depending on the type of the remote device. For example, if or when the type of the remote device 220 is a television (e.g., the first remote device 220A), then the first remote device 220A may be further configured to provide functionality typically associated with a television (e.g., display audio/video content, change channels). For another example, if or when the type of the remote device 220 is an air conditioner (e.g., the second remote device 220B), then the second remote device 220B may be further configured to provide functionality typically associated with an air conditioner (e.g., adjust temperature and/or speed of airflow generated by air conditioner).

Referring to FIG. 2, a direction of 0° (e.g., zero degrees) may refer to a direction of the remote control device 210 that is perpendicular to a top plane of the remote control device 210. A direction of 90° may refer to a positive direction of the remote control device 210 that is parallel to the top plane of the remote control device 210. and a direction of −90° may refer to a negative direction parallel to the top plane of the remote control device 210. Alternatively or additionally, these directions may be referred to as center, right, and left directions, respectively.

In some embodiments, the remote control device 210 may broadcast, using UWB signals, a control request to the remote devices 220. The remote devices 220 may reply to the control request with a UWB signal that comprises at least identification (ID) information of the correspond remote device 220. The remote control device 210 may estimate, for each remote device 220, an angle indicating a pointing direction to that remote device 220 relative to the remote control device 210. For example, the remote control device 210 may estimate that an angle to the first remote device 220A is approximately 0° and that an angle to the second remote device 220B is 0 (e.g., approximately 60°).

In some embodiments, the remote control device 210 may determine that the remote control device 210 is pointing to the first remote device 220A at least based on the angle estimations, and select, at least based on the determination, the first remote device 220A as the selected remote device 220 to be controlled. For example, the remote control device 210 may automatically select to first remote device 220A based at least on a determination that a pointing direction to the first remote device 220A relative to the remote control device 210 is approximately 0°.

Figure 3A:
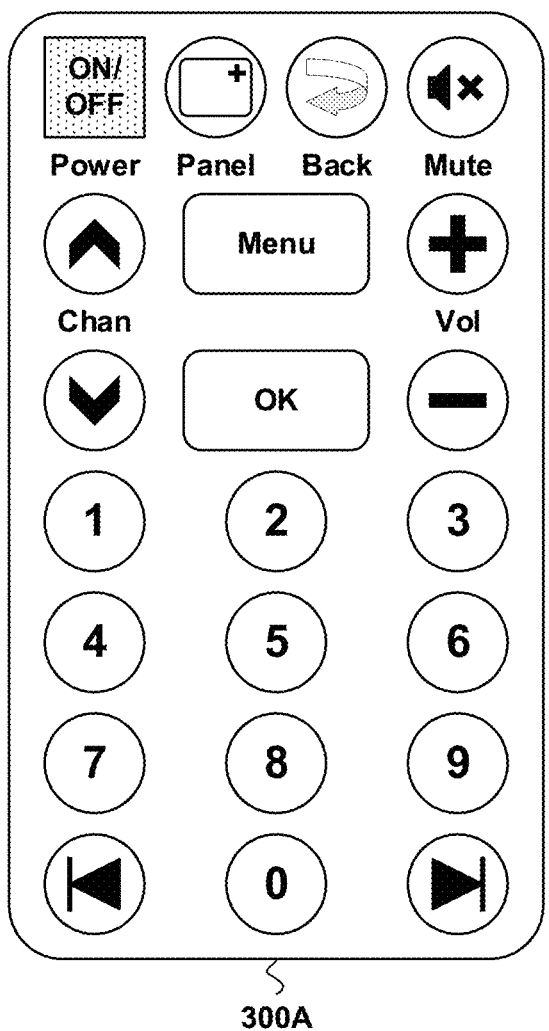
FIGS. 3A and 3B illustrate a first example and a second example, respectively, of a control user interface (UI) for controlling exemplary remote devices, in accordance with various aspects of the present disclosure.
Figure 3B:
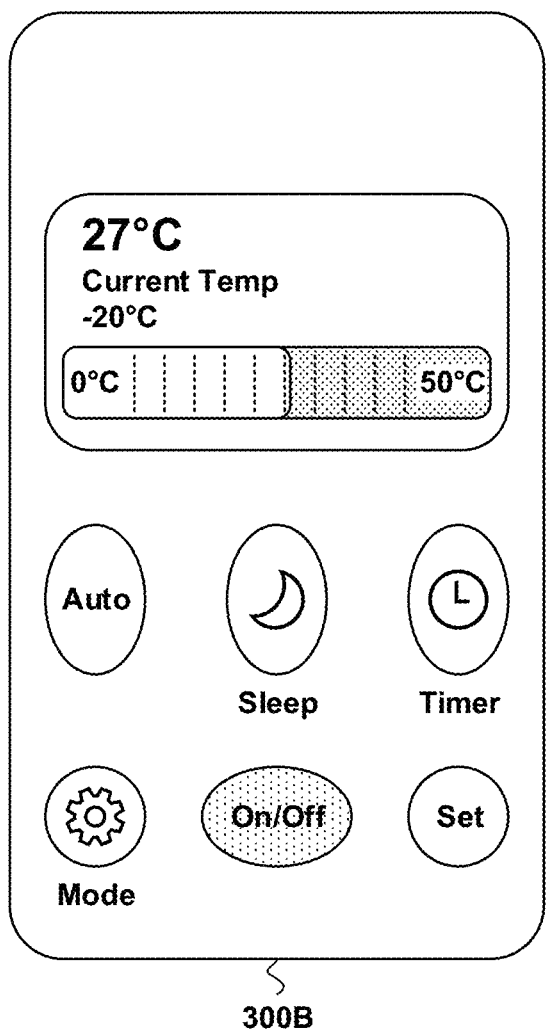

In some embodiments, the remote control device 210 may be configured to display a control user interface (UI) that corresponds to the selected remote device 220 and that may be configured to control the selected remote device 220. For example, if or when the type of the selected remote device 220 is a television (e.g., first remote device 220A), the remote control device 210 may display a television control UI 300A, as shown in FIG. 3A. That is, the television control UI 300A may provide a user of the remote control device 210 with a user interface configured to control the first remote device 220A. For another example, if or when the type of the selected remote device 220 is an air conditioner (e.g., the second remote device 220B), the remote control device 210 may display an air conditioning control UI 300B, as shown in FIG. 3B. That is, the air conditioning control UI 300B may provide a user of the remote control device 210 with a user interface configured to control the second remote device 220B.

In some embodiments, the remote control device 210 may identify the corresponding types of the remote devices 220 (e.g., television, air conditioner) based on the ID information transmitted by the remote device 220. For example, the ID information may comprise type identification information that the remote control device 210 may use to determine the control UI that corresponds to the selected remote device 220. Alternatively or additionally, the remote control device 210 may access device type mapping information that correlates the ID information transmitted by the remote device 220 to a corresponding device type and/or to a corresponding control UI. The device type mapping information may be accessed locally (e.g., may be stored in memory 130 and/or storage component 140 of FIG. 1) and/or may be accessed remotely (e.g., server, internet) using the communication interface 170 of FIG. 1.

In some embodiments, the user of the remote control device 210 may indicate an action to be performed by the selected remote device 220 via the control UI (e.g., control UI 300A, control UI 300B, hereinafter "300" generally) displayed by the remote control device 210. That is, the remote control device 210 may obtain, via the control UI 300, a user input indicating the action to be performed by the selected remote device 220.

In some embodiments, the remote control device 210 may be configured to send, to the remote devices 220, a UWB control signal comprising ID information of the selected remote device 220 and a control message indicating the action to be performed by the selected remote device 220. The remote devices 220 may receive the UWB control signal and perform the action indicated by the UWB control signal if the ID information comprised by the UWB control signal matches the ID information of the corresponding remote device 220. Alternatively or additionally, the remote devices 220 may prevent from performing the action indicated by the UWB control signal if the ID information comprised by the UWB control signal is different from the ID information of the corresponding remote device 220.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single devices, or a single devices shown in FIG. 2 may be implemented as multiple, distributed devices. Additionally or alternatively, a set of (one or more) devices shown in FIG. 2 may perform one or more functions described as being performed by another set of devices shown in FIG. 2.

Advantageously, and as illustrated in further detail in reference to FIGS. 4-9, the UWB remote control system 200 may leverage the spatial information (e.g., range, angle) provided by UWB radios to provide a user with a capability to automatically control a remote device 220 by the user simply pointing the remote control device 210 to the desired remote device 220, without the need for a manual pairing and/or learning procedure between the remote control device 210 and the remote device 220. Alternatively or additionally, and as illustrated in further detail in reference to FIGS. 4-9, the remote control device 210 may seamlessly switch control between different remote devices 220 as the pointing direction of the remote control device 210 is changed (e.g., by the user). Thus, potentially providing an improved user experience when compared to related one-for-all remote control devices.

As noted above, UWB radios may provide spatial information (e.g., range, angle) to the UWB-enabled remote control device 210 and to the UWB-enabled remote devices 220. However, UWB signals may be affected by interference, multipath, and/or other sources of noise, and, as a result, provide erroneous and/or inaccurate spatial information (e.g., angle estimates). By implementing the remote control device 210 and the remote devices 220 in accordance with one or more aspects of the present disclosure, however, these and/or other issues may be overcome. For example, and as illustrated in further detail in reference to FIGS. 4-9, a remote control device 210 and/or a remote device 220 implementing one or more aspects of the present disclosure may utilize a workflow for performing UWB remote control that includes one or more algorithms and/or neural-network (NN)-based angle estimation fusion that may improve angle estimation accuracy.

Figure 4:
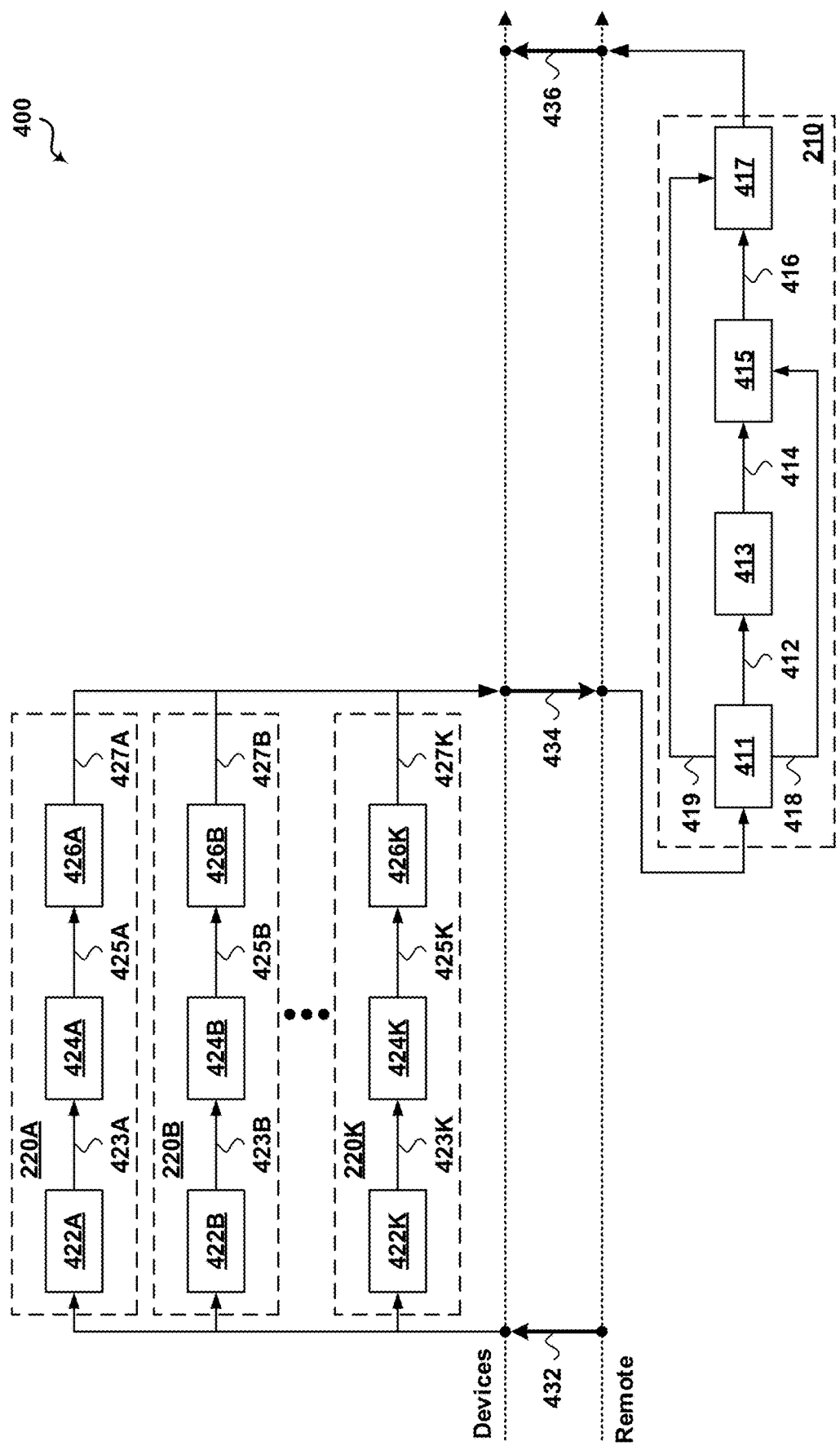
FIG. 4 depicts an example workflow for performing UWB remote control, in accordance with various aspects of the present disclosure.

FIG. 4 depicts an example workflow for performing UWB remote control, in accordance with various aspects of the present disclosure. The workflow 400 for performing UWB remote control illustrated in FIG. 4 may be implemented by at least one remote control device 210 and a plurality of remote devices (e.g., 220A, 220B, . . . , 220K, hereinafter "220" generally, where K is a positive integer greater than 1). The remote control device 210 and the remote devices 220 depicted in FIG. 4 are similar in many respects to the remote control device 210 and the remote devices 220 described above with reference to FIG. 2 and may include additional features not mentioned above. Alternatively or additionally, another wireless computing device (e.g., device 100 of FIG. 1) that comprises the UWB remote control component 180 of FIG. 1 may implement at least a portion of the workflow 400 for performing UWB remote control.

Referring to FIG. 4, the remote control device 210 may broadcast, using a UWB signal, an initial control request 432 to the plurality of remote devices 220. For example, the remote control device 210 may use the communication interface 170 of FIG. 1 and/or a UWB transmit (TX)

component 417 of the remote control device 210 to transmit the UWB signal comprising the initial control request 432 to the remote devices 220.

In some embodiments, the remote devices 220 may receive the initial control request 432. That is, the remote devices 220 may receive the UWB signal comprising the initial control request 432 using the communication interface 170 of FIG. 1 and/or a UWB receive (RX) component (e.g., first UWB RX component 422A, second UWB RX component 422B, . . . , K-th UWB RX component 422K, hereinafter "422" generally).

In some embodiments, the remote devices 220 may generate power spectrum information (e.g., first power spectrum information 425A, second power spectrum information 425B, . . . , K-th power spectrum information 425K, hereinafter "425" generally) based on at least the initial control request 432. For example, if it is assumed that $S_k$ refers to the UWB signal received by the k-th device, where k is a positive integer greater than or equal to 0 and less than K (e.g., $0 \le k \le K$), then a range power-based angle estimation algorithm (e.g., first range power-based angle estimation algorithm 424A, second range power-based angle estimation algorithm 424B, . . . , K-th range power-based angle estimation algorithm 424K, hereinafter "424" generally) may generate, using $S_k$ as an input, a power spectrum $G(\theta_k)$ 425 of a coarse estimated angle $\theta_k$ for the k-th device. The range power-based angle estimation algorithm 424 is described in further detail in reference to FIG. 5.

In some embodiments, a UWB transmit (TX) component (e.g., first UWB TX component 426A, second UWB TX component 426B, . . . , K-th UWB TX component 426K, hereinafter "426" generally) of the remote device 220 may be configured to generate a UWB signal comprising a reply message (e.g., first reply message 427A, second reply message 427B, . . . , K-th reply message 427K, hereinafter "427" generally) that may comprise the power spectrum information $G(\theta_k)$ 425. Alternatively or additionally, the reply message 427 may comprise ID information of the remote device 220. That is, the remote device 220 may use the communication interface 170 of FIG. 1 and/or the UWB TX component 426 of the remote device 220 to transmit a UWB signal comprising the reply message 427 to the remote control device 210.

In some embodiments, the remote control device 210 may receive, from one or more remote devices 220 and in response to the initial control request 432, at least one reply message 434 comprising ID information and power spectrum information 425 of the corresponding remote device 220. The power spectrum information 425 may have been generated based on at least the initial control request 432. That is, the remote control device 210 may use the communication interface 170 of FIG. 1 and/or the UWB RX component 411 of the remote control device 210 to receive at least one UWB signal comprising at least one reply message 434 from the remote devices 220.

The UWB RX component 411 may be further configured to decode the at least one UWB signal comprising the at least one reply message 434 to obtain the power spectrum information 425 (e.g., $\{G(\theta_A), G(\theta_B), \ldots, G(\theta_K)\}$) and the ID information of the corresponding remote devices 220. Alternatively or additionally, the UWB RX component 411 may further decode the at least one UWB signal to obtain a signal phase 412 of each of the at least one UWB signal received from the remote devices 220.

In some embodiments, the remote control device 210 may generate a coarse-grained angle estimate $\theta_k$ 414 for each of the remote devices 220, based at least on their respective signal phases 412. For example, the remote control device 210 may provide the signal phases 412 as input to an angle estimation component 413 that may generate a set of coarse-grained angle estimates 414 (e.g., $\{\theta'_A, \theta'_B, \ldots, \theta'_K\}$) as outputs. In some embodiments, the angle estimation component 413 may comprise an angle estimation algorithm such as, but not limited to, a multiple signal classification (MUSIC) algorithm, an estimation of signal parameters via rotational invariance technique (ESPIRIT), and the like.

In some embodiments, the remote control device 210 may estimate, using a NN-based angle estimation fusion algorithm 415, an angle indicating a pointing direction to each remote device 220 relative to the remote control device 210, based at least on the power spectrum information 418. The NN-based angle estimation fusion algorithm 415 may further determine the selected remote device 220 that is being pointed to by the remote control device 210.

In some embodiments, the remote control device 210 may be further configured determine the selected remote device 220 based on the action to be performed by the selected remote device 220. That is, the remote control device 210 may determine the selected remote device 220 if or when the action to be performed is an action that may be performed by the selected remote device 220. For example, if or when the estimated angle for the first remote device 220A (e.g., a television) is relatively similar to the estimated angle for the second remote device 220B (e.g., an air conditioner), the remote control device 210 may be configured to select the second remote device 220B if or when the action to be performed is an action that may be performed by the second remote device 220B and may not be performed by the first remote device 220A (e.g., "lower temperature setting by 1 degree").

In some embodiments, the remote control device 210 may send, to the remote devices 220, a UWB control signal 436 comprising the ID information of the selected remote device and a control message indicating an action to be performed by the selected remote device 220. That is, the remote control device 210 may use the communication interface 170 of FIG. 1 and/or the UWB TX component 417 to transmit the UWB control signal 436 to the remote devices 220.

In some embodiments, the remote devices 220 may receive the UWB control signal 436 transmitted by the remote control device 210 and determine whether to perform the action indicated by the UWB control signal 436. For example, the remote device 220 may determine whether the ID information indicated by the UWB control signal 436 matches the ID information of the remote device 220 that received the UWB control signal 436. Based on a determination that the ID information matches, the remote device 220 may determine to perform the action indicated by the UWB control signal 436. Alternatively or additionally, the remote device 220 may determine to prevent performing of the action based on a determination that the ID information is different (e.g., does not match).

The number and arrangement of devices and/or components shown in FIG. 4 are provided as an example. In practice, there may be additional devices and/or components, fewer devices and/or components, different devices and/or components, or differently arranged devices and/or components than those shown in FIG. 4. Furthermore, two or more components shown in FIG. 4 may be implemented within a single component, or a single component shown in FIG. 4 may be implemented as multiple, distributed components. Additionally or alternatively, a set of (one or more) components shown in FIG. 4 may perform one or more functions described as being performed by another set of components shown in FIG. 4.

Figure 5:
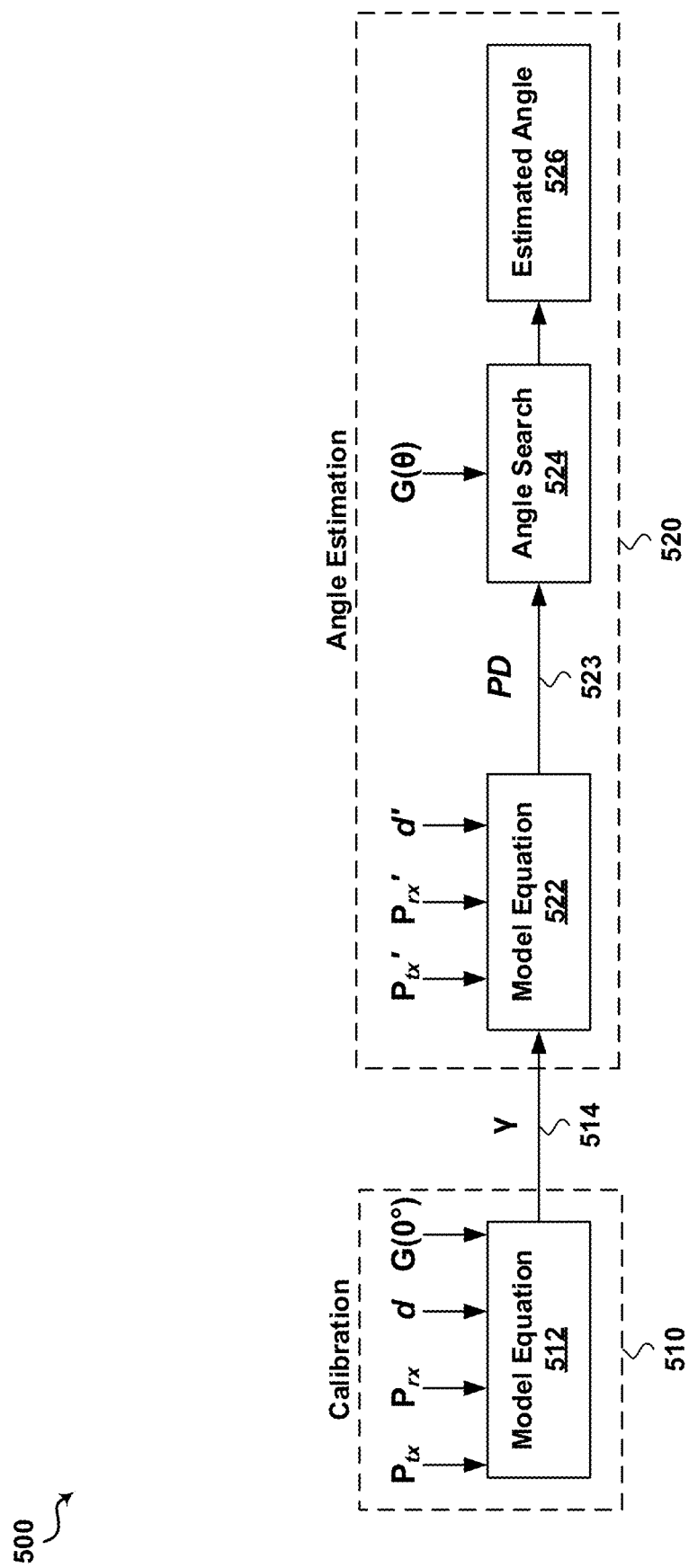
FIG. 5 illustrates an exemplary workflow for range power-based angle estimation, in accordance with various aspects of the present disclosure.

FIG. 5 illustrates an exemplary workflow for range power-based angle estimation, in accordance with various aspects of the present disclosure. In some embodiments, at least a portion of the range power-based angle estimation may be implemented by the remote device 220 of FIGS. 2 and 4. Alternatively or additionally, another computing device (e.g., device 100 of FIG. 1) that comprises the UWB remote control component 180 of FIG. 1 may implement at least a portion of the range power-based angle estimation.

As shown in FIG. 5, the range power-based angle estimation workflow 500 may comprise two steps. For example, the range power-based angle estimation workflow 500 may comprise an offline calibration step 510 and an online angle estimation step 520.

In some embodiments, the remote device 220 may perform the offline calibration step 510 to calibrate an environment-related parameter γ 514 for a new environment. The angle estimation step 520 may use the environment-related parameter γ 514 to prevent angle estimation errors due to environment differences (e.g., obstructions, distance between sitting position and remote device).

To perform the offline calibration step 510, the user of the remote control device 210 may be asked to point the remote control device 210 to the remote device 220 while the remote control device 210 transmits a short preamble UWB signal at a predetermined power level $P_{tx}$. That is, the remote control device 210 use the communication interface 170 of FIG. 1 and/or the UWB TX component 417 to transmit the short preamble UWB signal to the remote device 220. In some embodiments, the short preamble UWB signal may comprise ID information of the remote device 220.

In some embodiments, the remote device 220 may receive the short preamble UWB signal from the remote control device 210. That is, the remote device 220 use the communication interface 170 of FIG. 1 and/or the UWB RX component 422 to receive the short preamble UWB signal from the remote control device 210. In some embodiments, the remote device 220 may decode the short preamble UWB signal to obtain the ID information indicated by the short preamble UWB signal and determine whether the short preamble UWB signal was transmitted to the remote device 220.

In some embodiments, the remote device 220 may calculate a distance d between the remote device 220 and the remote control device 210 that transmitted the short preamble UWB signal. For example, the remote device 220 may calculate the distance d based at least on a received signal power $P_{rx}$ of the received short preamble UWB signal.

In some embodiments, the remote device 220 may calculate the environment-related parameter γ 514 based on at least the short preamble UWB signal, using model equation 512 that may be similar to Equation 1 as shown below.

$$\gamma = \frac{P_{tx} + G(0°) - P_{rx}}{10 \log d} \quad \text{[Eq. 1]}$$

Referring to Eq. 1, G(0°) represents the antenna gain of the remote device 220 at a zero degree angle direction.

Referring to the online angle estimation step 520 of FIG. 5, the remote device 220 may receive, from the remote control device 210, the initial control request 432 using the communication interface 170 of FIG. 1 and/or the UWB RX component 422. That is, the remote device 220 may receive a UWB signal, that comprises the initial control request 432, at a received signal power $P'_{rx}$, that has been transmitted (e.g., broadcast) by the remote control device 210 at a transmitted signal power $P'_{tx}$. Alternatively or additionally, the remote device 220 may calculate the distance d' between the remote control device 210 and the remote device 220 based at least on the received signal power $P'_{rx}$ of the received initial control request 432.

In some embodiments, the remote device 220 may calculate the power difference PD 523 based on at least the initial control request 432, using model equation 522 that may be similar to Equation 2 as shown below.

$$PD = P'_{tx} - P'_{rx} - 10\gamma \log d' \quad \text{[Eq. 2]}$$

Referring to Eq. 2, γ represents the environment-related parameter γ 514 calculated in the offline calibration step 510.

Figure 6:
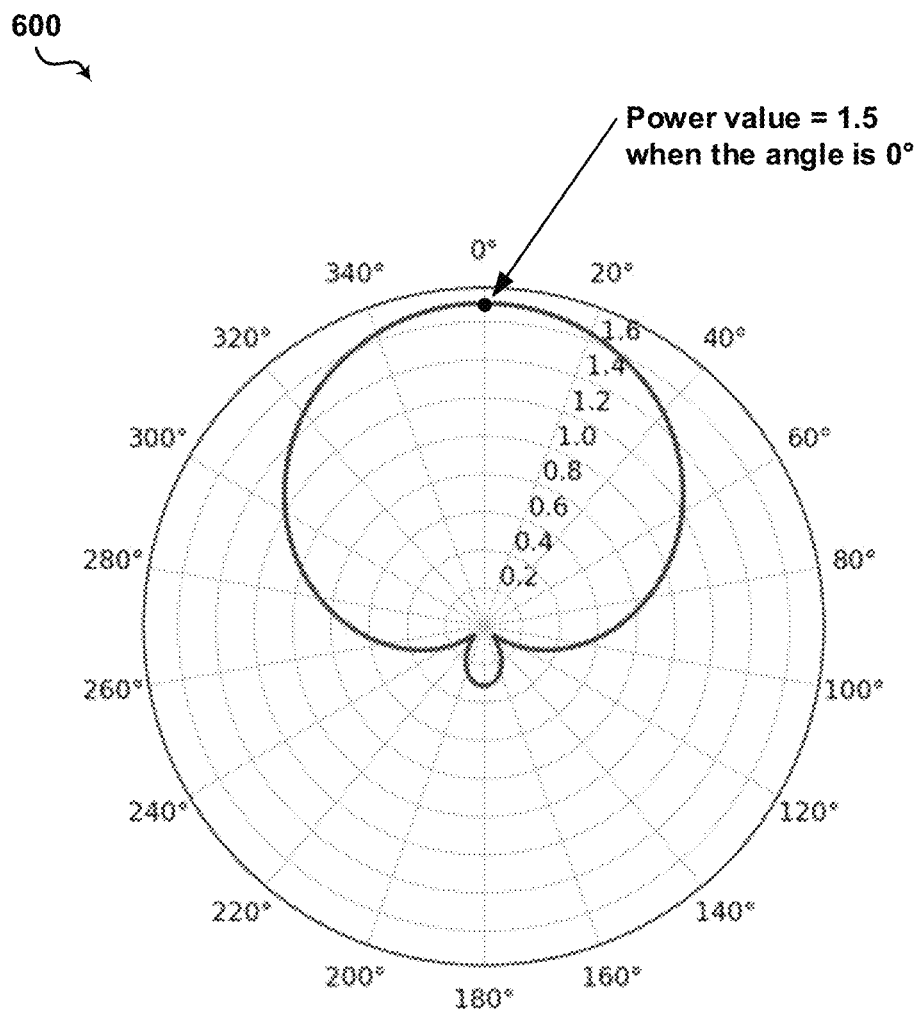
FIG. 6 depicts an illustration of an example of an antenna radiation spectrum, in accordance with various aspects of the present disclosure.

The remote device 220 may be configured to perform an angle search 524 to obtain a coarse-grained estimated angle 526 of the received initial control request 432. In some embodiments, the remote device 220 may compare the estimated power difference PD 523 with an antenna radiation spectrum G(θ) of the remote device 220 to obtain the coarse-grained estimated angle 526 of the received initial control request 432. FIG. 6 depicts an illustration of an example of an antenna radiation spectrum G(θ) 600, in accordance with various aspects of the present disclosure. For example, using the antenna radiation spectrum G(θ) 600 depicted in FIG. 6, the remote device 220 may obtain the coarse-grained estimated angle 526 of the received initial control request 432 that corresponds to the estimated power difference PD 523. As shown in FIG. 6, if or when the power difference PD 523 is approximately 1.5, the remote device 220 may estimate that the coarse-grained estimated angle 526 of the received initial control request 432 is 0° (e.g., zero degrees).

It is understood that the antenna radiation spectrum G(θ) 600 depicted in FIG. 6 is an illustration of an example antenna radiation spectrum and that other antenna radiation spectrums may be utilized without deviating from the scope of the present disclosure. For example, other antenna radiation spectrums may have different shapes and/or power values, as the present disclosure is not limited in this regard.

Returning to FIG. 5, in some embodiments, the remote device 220 may be configured to send the reply message 427 (as shown in FIG. 4) that comprises the power spectrum information 425. The power spectrum information 425 may comprise the power spectrum $G(\theta_k)$ value and the coarse-grained estimated angle $\theta_k$ 526 that have been generated based at least on the received initial control request 432 and the environment-related parameter γ 514.

Figure 7A:
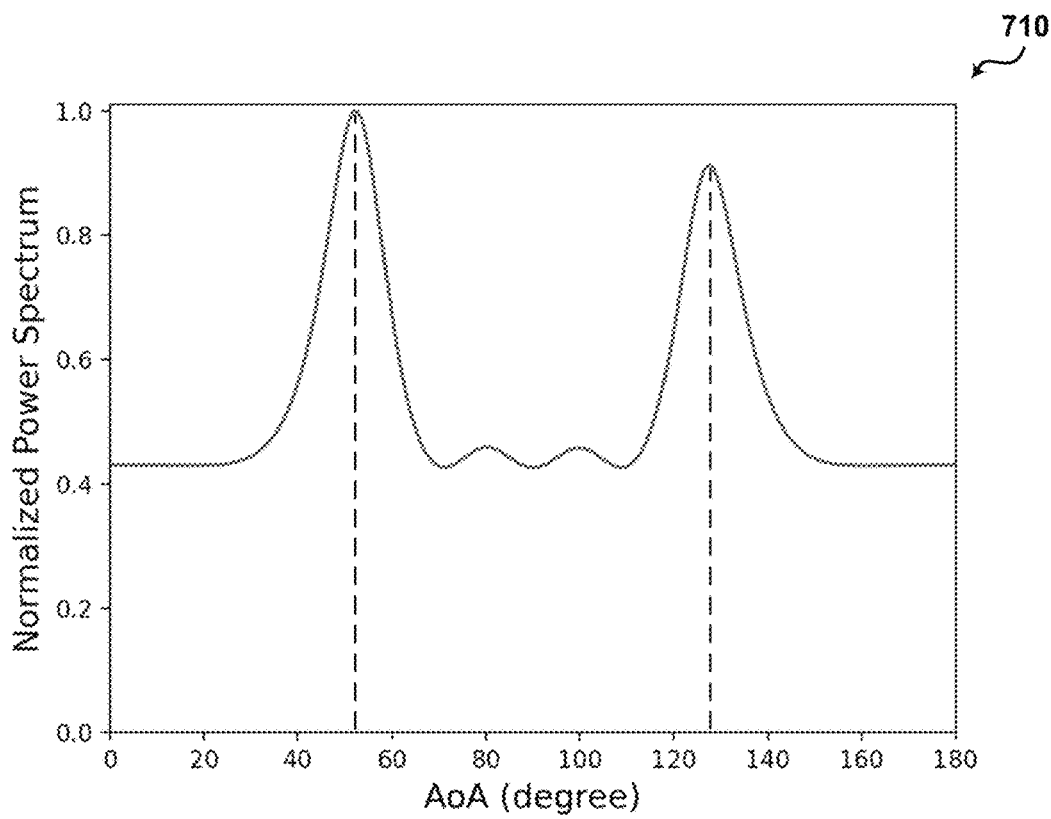
FIGS. 7A and 7B illustrate a first example and a second example, respectively, of normalized power spectrums by incident angle-of-attack (AoA), in accordance with various aspects of the present disclosure.
Figure 7B:
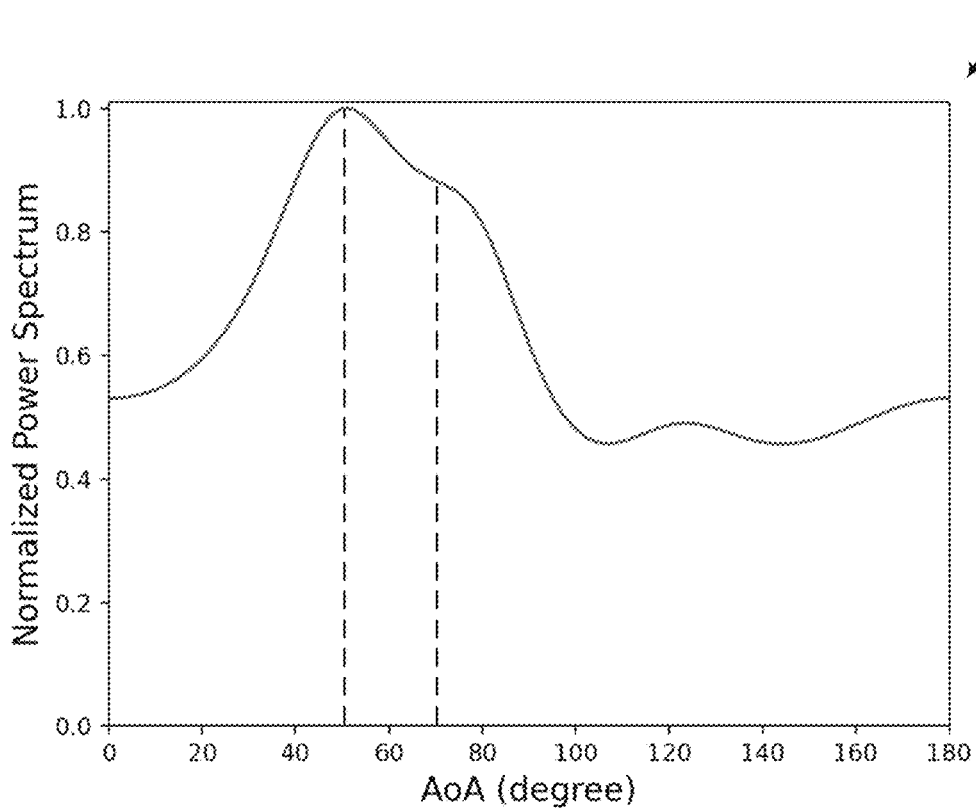

FIGS. 7A and 7B illustrate a first example and a second example, respectively, of normalized power spectrums by incident angle-of-arrival (AoA), in accordance with various aspects of the present disclosure.

Referring to FIG. 7A, the normalized power spectrum 710 shows a first UWB signal received from a first remote device 220A at an AoA of approximately 50° and a second UWB signal received from a second remote device 220B at an AoA of approximately 130°. Since the two UWB signals are received at relatively distant angles, a related coarse-grained angle estimation algorithm may be able to distinguish between the two angles and correctly estimate the AoA of the two signals.

Referring to FIG. 7B, the normalized power spectrum 750 shows a relatively strong UWB signal received at an AoA of approximately 50° and a relatively weak UWB signal received at an AoA of approximately 70°. Since the two UWB signals in this example are received at relatively close angles, when compared to FIG. 7A, for example, a related coarse-grained angle estimation algorithm may not be able to distinguish between the two UWB signals. As a result, one of the UWB signals may be missed. For example, the related coarse-grained angle estimation algorithm may only indicate the relatively strong UWB signal received at the 50° AoA. By implementing NN-based angle estimation fusion algorithm 415, in accordance with one or more aspects of the present disclosure, however, these and/or other issues may be overcome. The NN-based angle estimation fusion algorithm 415 is described in further detail in reference to FIGS. 8 and 9.

Figure 8:
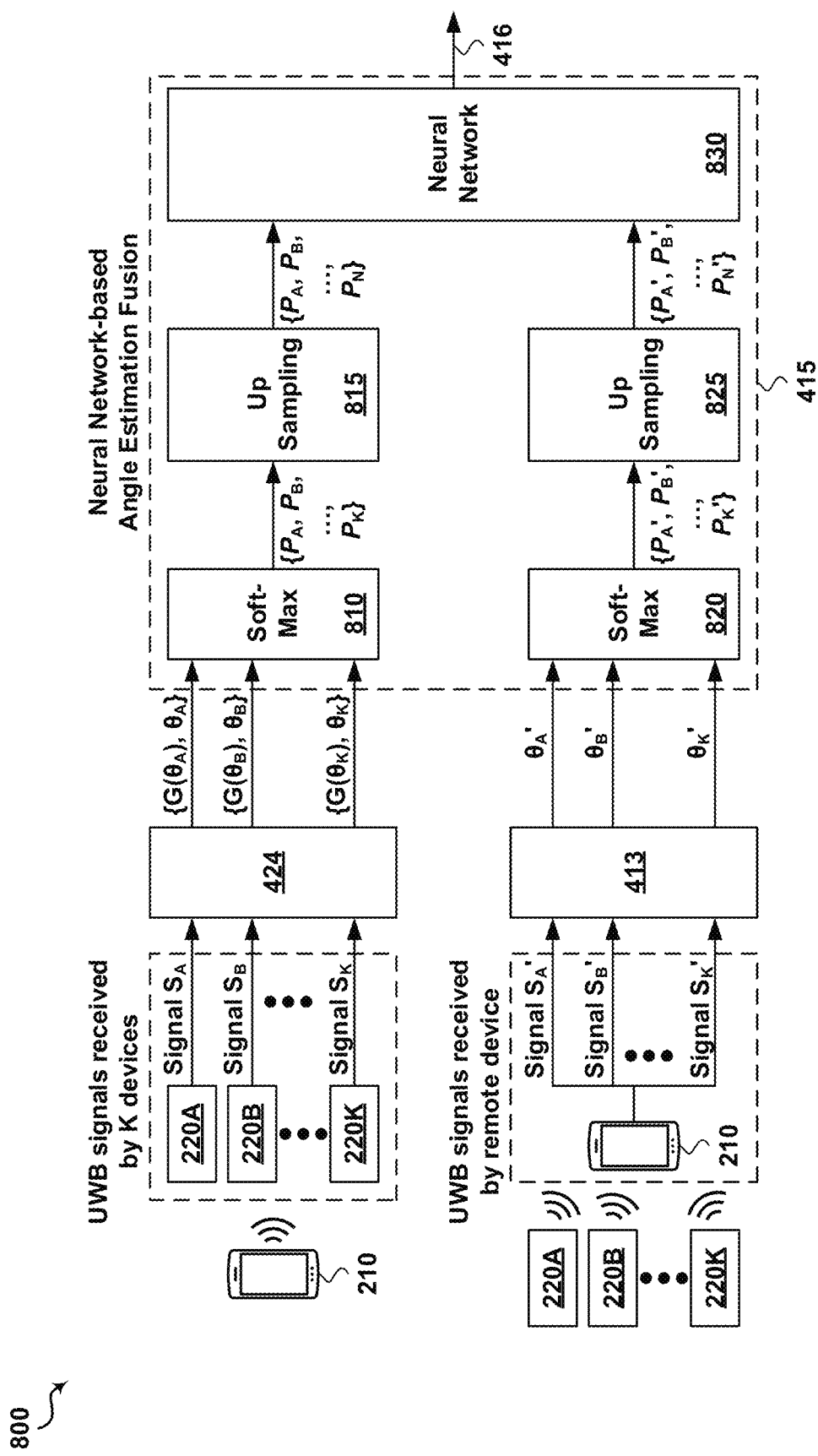
FIG. 8 depicts an example of a workflow of neural network (NN)-based fusion for fine-grained angle estimation, in accordance with various aspects of the present disclosure.

FIG. 8 depicts an example of a workflow of NN-based fusion algorithm for fine-grained angle estimation, in accordance with various aspects of the present disclosure. The workflow 800 of the NN-based fusion algorithm 415 for fine-grained angle estimation depicted in FIG. 8 is similar in many respects to the workflow 400 described above with reference to FIG. 4 and may include additional features not mentioned above.

The workflow 800 of the NN-based fusion algorithm 415 for fine-grained angle estimation illustrated in FIG. 8 may be implemented by at least one remote control device 210 and a plurality of remote devices (e.g., 220A, 220B, . . . , 220K, hereinafter "220" generally, where K is a positive integer greater than 1). The remote control device 210 and the remote devices 220 depicted in FIG. 8 are similar in many respects to the remote control device 210 and the remote devices 220 described above with reference to FIGS. 2 and 4 and may include additional features not mentioned above. Alternatively or additionally, another wireless computing device (e.g., device 100 of FIG. 1) that comprises the UWB remote control component 180 of FIG. 1 may implement at least a portion of the workflow 800 of the NN-based fusion algorithm 415 for fine-grained angle estimation.

As shown in FIG. 8, the NN-based angle estimation fusion algorithm 415 may receive as an input a set of power spectrum information 425 from each remote device 220 (e.g., {{G($\theta_A$), $\theta_A$}, {G($\theta_B$), $\theta_B$}, . . . , {G($\theta_K$), $\theta_K$}}). The power spectrum information 425, as described in further detail in reference to FIGS. 4 and 5, may comprise the power spectrum G($\theta_k$) value and the coarse-grained estimated angle $\theta_k$ 526, and may have been generated by the range power-based angle estimation algorithm 424, based at least on the received initial control request 432 and the environment-related parameter $\gamma$ 514.

Alternatively or additionally, the NN-based angle estimation fusion algorithm 415 may receive as an input a set of coarse-grained angle estimates 414 corresponding to the remote devices 220 (e.g., {$\theta'_A$, $\theta'_B$, . . . , $\theta'_K$}). The coarse-grained angle estimates 414, as described in further detail in reference to FIG. 4, may have been generated by the angle estimation component 413 based at least on the signal phases 412 of the reply messages 434 received from by the remote control device 210 from the remote devices 220.

In some embodiments, the NN-based angle estimation fusion algorithm 415 may use a soft-max component 810 to calculate a probability distribution {$P_A$, $P_B$, . . . , $P_K$} based on the set of power spectrum information 425 from each remote device 220 (e.g., {{G($\theta_A$), $\theta_A$}, {G($\theta_B$), $\theta_B$}, . . . , {G($\theta_K$), $\theta_K$}}). The soft-max component 810 may calculate the probability of the pointing direction of the remote control device 210 being at an angle $\theta_k$ using an equation similar to Equation 3 as shown below.

$$P_k = e^{G(\theta_k)} / \Sigma_k e^{G(\theta_k)} \quad \text{[Eq. 3]}$$

Referring to Eq. 3, $P_k$ represents the probability of the pointing direction of the remote control device 210 being at an angle $\theta_k$.

Alternatively or additionally, the NN-based angle estimation fusion algorithm 415 may use a soft-max component 820 to calculate a probability distribution {$P'_A$, $P'_B$, . . . , $P'_K$} based on the set of coarse-grained angle estimates 414 corresponding to the remote devices 220 (e.g., {$\theta'_A$, $\theta'_B$, . . . , $\theta'_K$}). The soft-max component 820 may calculate the probability of the pointing direction of the remote control device 210 being at an angle $\theta_k$ using an equation similar to Equation 4 as shown below.

$$P'_k = e^{\frac{1}{\theta'_k}} / \sum_k e^{\frac{1}{\theta'_k}} \quad \text{[Eq. 4]}$$

Referring to Eq. 4, $P'_k$ represents the probability of the pointing direction of the remote control device 210 being at the angle $\theta'_k$.

In some embodiments, the NN-based angle estimation fusion algorithm 415 may, using the up-sampling components 815 and 825, up-sample the K-dimension probability distributions {$P_A$, $P_B$, . . . , $P_K$} and {$P'_A$, $P'_B$, . . . , $P'_K$} into N-dimension probability distributions {$P_A$, $P_B$, . . . , $P_N$} and {$P'_A$, $P'_B$, . . . , $P'_N$}, respectively. For example, the up-sampling components 815 and 825 may use non-linear interpolation to up-sample the K-dimension probability distributions {$P_A$, $P_B$, . . . , $P_K$} and {$P'_A$, $P'_B$, . . . , $P'_K$} into the N-dimension probability distributions {$P_A$, $P_B$, . . . , $P_N$} and {$P'_A$, $P'_B$, . . . , $P'_N$}, respectively. That is, an up-sampled probability $P_n$ may correspond to approximately $$\left(P_k \times \frac{N}{K}\right).$$

The up-sampling of the probability distributions may improve robustness such that the NN-based angle estimation fusion algorithm 415 may provide accurate fine-grained angle estimates with a wider range of remote device quantities (e.g., K).

In some embodiments, the neural network 830 of the NN-based angle estimation fusion algorithm 415 may be configured to take the two N-dimension probability distributions {$P_A$, $P_B$, . . . , $P_N$} and {$P'_A$, $P'_B$, . . . , $P'_N$} as input and generate a fine-grained estimate of an angle 416 indicating a pointing direction to the remote devices 220 relative to the remote control device 210. The neural network 830 may be an artificial intelligence (AI) model comprising a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

In some embodiments, the UWB RX component 411 of the remote control device 210 may utilize an antenna pair (e.g., two antennas) to receive UWB signals (e.g., reply message 434) from the remote devices 220. In such embodiments, the neural network 830 of the NN-based angle estimation fusion algorithm 415 may be configured to generate the fine-grained angle estimate 416 in a two dimensional (2D) space. For example, the fine-grained angle estimate 416 may be relative to a 2D orientation of the remote control device 210. Alternatively or additionally, the UWB RX component 411 may utilize an antenna triad (e.g., three antennas) to receive the UWB signals. In such embodiments, the neural network 830 of the NN-based angle estimation fusion algorithm 415 may be configured to generate the fine-grained angle estimate 416 in a three dimensional (3D) space. For example, the fine-grained angle estimate 416 may be relative to a 3D orientation of the remote control device 210.

Advantageously, the workflow 800 of the NN-based fusion algorithm 415 for fine-grained angle estimation may overcome interference, multipath, and/or other sources of noise that could result in erroneous and/or inaccurate spatial information (e.g., angle estimates) in related UWB-enabled devices. Alternatively or additionally, the remote control device 210 may seamlessly switch control between different remote devices 220 as the pointing direction of the remote control device 210 is changed (e.g., by the user). Thus, potentially providing an improved user experience when compared to related one-for-all remote control devices.

Figure 9:
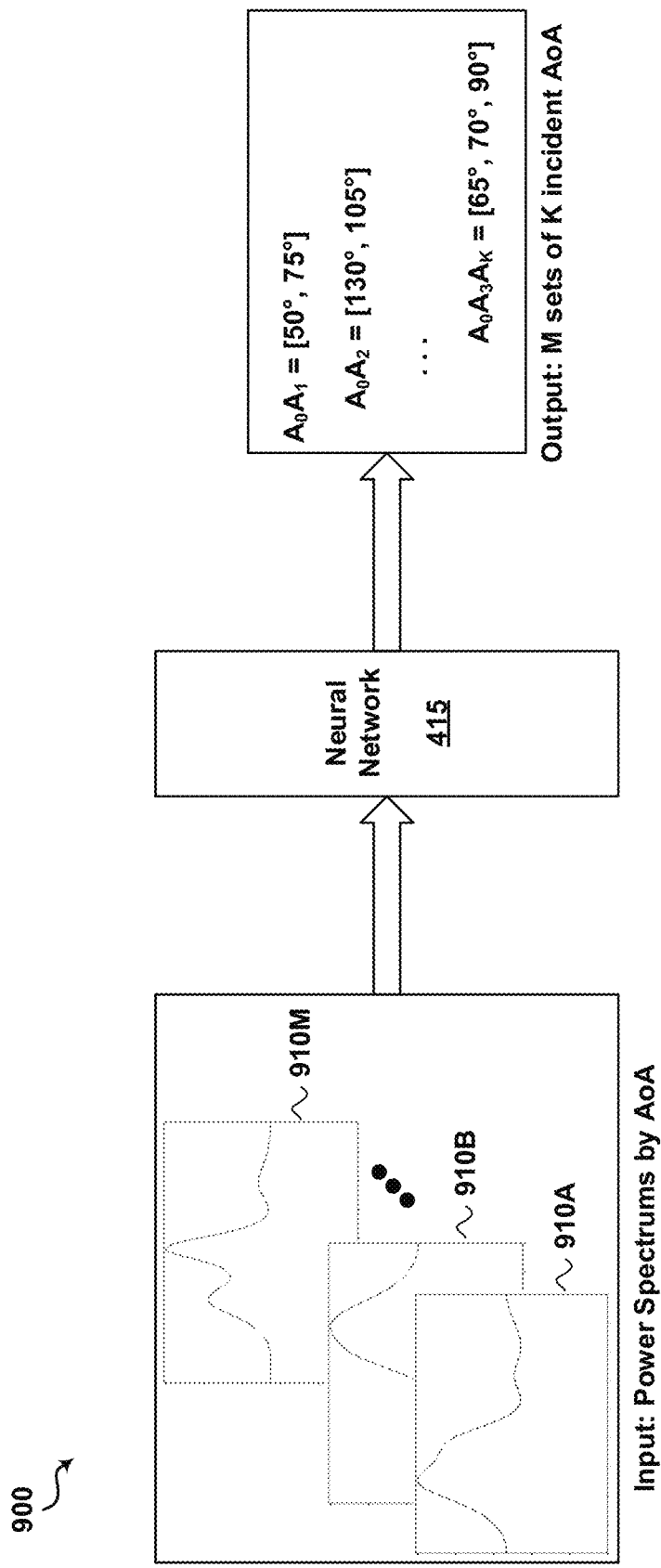
FIG. 9 illustrates an example training workflow of a NN for fine-grained angle estimation, in accordance with various aspects of the present disclosure.

FIG. 9 illustrates an example training workflow of a NN for fine-grained angle estimation, in accordance with various aspects of the present disclosure. The training workflow 900 of the NN-based fusion algorithm 415 for fine-grained angle estimation illustrated in FIG. 9 may be implemented by a remote control device 210. The remote control device 210 may be similar in many respects to the remote control device 210 described above with reference to FIGS. 2, 4, and 8 and may include additional features not mentioned above. Alternatively or additionally, another wireless computing device (e.g., device 100 of FIG. 1) that comprises the UWB remote control component 180 of FIG. 1 may implement at least a portion of the training workflow 900.

As shown in FIG. 9, a set of M normalized power spectrums by incident AoA may be collected (e.g., 910A, 910B, ..., 910M, hereinafter "910" generally), where M is a positive integer greater than 1. The power spectrums 910 may comprise a variety of combinations of UWB signals transmitted at a variety of known power levels and/or distances from a variety of known incident AoAs. For example, if or when the NN-based fusion algorithm 415 is being trained for an indoor environment, the power spectrums 910 may typically comprise a combination of approximately 2 to 4 angles. That is, the power spectrums 910 may simulate 2 to 4 remote devices 220 simultaneously transmitting UWB signals to the remote control device 210 at a variety of incident AoAs.

Using the power spectrums 910 as inputs, the NN-based fusion algorithm 415 may be trained to output incident AoAs that are similar to the known incident AoAs of the power spectrums 910. For example, the NN-based fusion algorithm 415 may be trained using any known technique for training neural networks, such as, but not limited to, stochastic gradient descent (SGD), Newton's method (NM), Levenberg-Marquardt algorithm (LM), and back propagation (BP).

Figure 10:
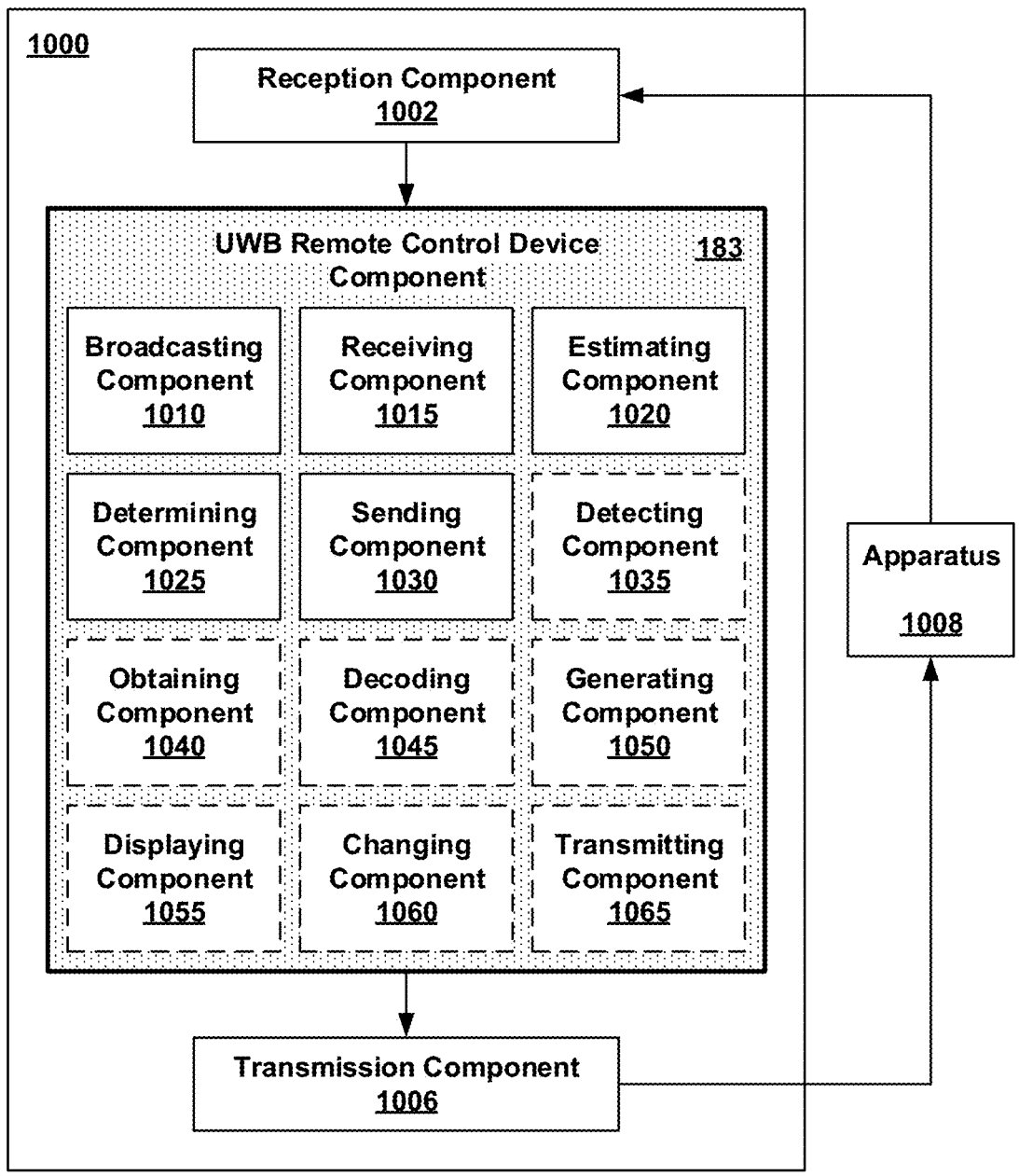
FIG. 10 illustrates a block diagram of an example apparatus, such as a remote control device, for performing UWB remote control, in accordance with various aspects of the present disclosure.

FIG. 10 illustrates a block diagram of an example apparatus 1000 for UWB remote control to be performed by a remote control device. The apparatus 1000 may be a computing device (e.g., device 100 of FIG. 1, remote control device 210 of FIGS. 2-9) and/or a computing device may comprise the apparatus 1000. In some embodiments, the apparatus 1000 may comprise a reception component 1002 configured to receive communications (e.g., wired, wireless) from another apparatus (e.g., apparatus 1008), a UWB remote control device component 183 configured to perform UWB remote control, and a transmission component 1006 configured to transmit communications (e.g., wired, wireless) to another apparatus (e.g., apparatus 1008). The components of the apparatus 1000 may be in communication with one another (e.g., via one or more buses or electrical connections). As shown in FIG. 10, the apparatus 1000 may be in communication with another apparatus 1008 (such as a database, a server, a remote device 220, or another computing device) using the reception component 1002 and/or the transmission component 1006.

In some embodiments, the apparatus 1000 may be configured to perform one or more operations described herein in connection with FIGS. 1-9. Alternatively or additionally, the apparatus 1000 may be configured to perform one or more processes described herein, such as method 1100 of FIG. 11. In some embodiments, the apparatus 1000 may comprise one or more components of the device 100 described above in connection with FIGS. 1-9.

The reception component 1002 may receive communications, such as control information, data communications, or a combination thereof, from the apparatus 1008 (e.g., a database, a server, a remote device 220, or another computing device). The reception component 1002 may provide received communications to one or more other components of the apparatus 1000, such as the UWB remote control device component 183. In some embodiments, the reception component 1002 may perform signal processing on the received communications, and may provide the processed signals to the one or more other components. In some embodiments, the reception component 1002 may comprise the UWB RX component 411 described above in reference to FIG. 4. In some embodiments, the reception component 1002 may comprise one or more antennas, a receive processor, a controller/processor, a memory, or a combination thereof, of the device 100 described above in reference to FIG. 1.

The transmission component 1006 may transmit communications, such as control information, data communications, or a combination thereof, to the apparatus 1008 (e.g., a database, a server, a remote device 220, or another computing device). In some embodiments, the UWB remote control device component 183 may generate communications and may transmit the generated communications to the transmission component 1006 for transmission to the apparatus 1008. In some embodiments, the transmission component 1006 may perform signal processing on the generated communications, and may transmit the processed signals to the apparatus 1008. In some embodiments, the transmission component 1006 may comprise the UWB TX component 417 described above in reference to FIG. 4. In other embodiments, the transmission component 1006 may comprise one or more antennas, a transmit processor, a controller/processor, a memory, or a combination thereof, of the device 100 described above in reference to FIG. 1. In some embodiments, the transmission component 1006 may be co-located with the reception component 1002 such as in a transceiver and/or a transceiver component.

The UWB remote control device component 183 may be configured to perform UWB remote control for a remote control device. In some embodiments, the UWB remote control device component 183 may include a set of components, such as a broadcasting component 1010 configured to broadcast an initial control request, a receiving component 1015 configured to receive at least one reply message, an estimating component 1020 configured to estimate an angle for each remote device, a determining component 1025 configured to determine a selected remote device, and a sending component 1030 configured to send a control signal to the selected remote device.

Alternatively or additionally, the UWB remote control device component 183 may further include a detecting component 1035 configured to detect a change in a pointing orientation of the remote control device, an obtaining component 1040 configured to obtain a user input indicating the action to be performed, a decoding component 1045 configured to decode respective signal phases of the at least one reply message, a generating component 1050 configured to generate coarse-grained angle estimates for each remote device, a displaying component 1055 configured to display a control UI corresponding to the selected remote device, a changing component 1060 configured to change display of the control UI to another control UI, and a transmitting component 1065 configured to transmit a short preamble UWB signal.

In some embodiments, the set of components may be separate and distinct from the UWB remote control device component 183. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
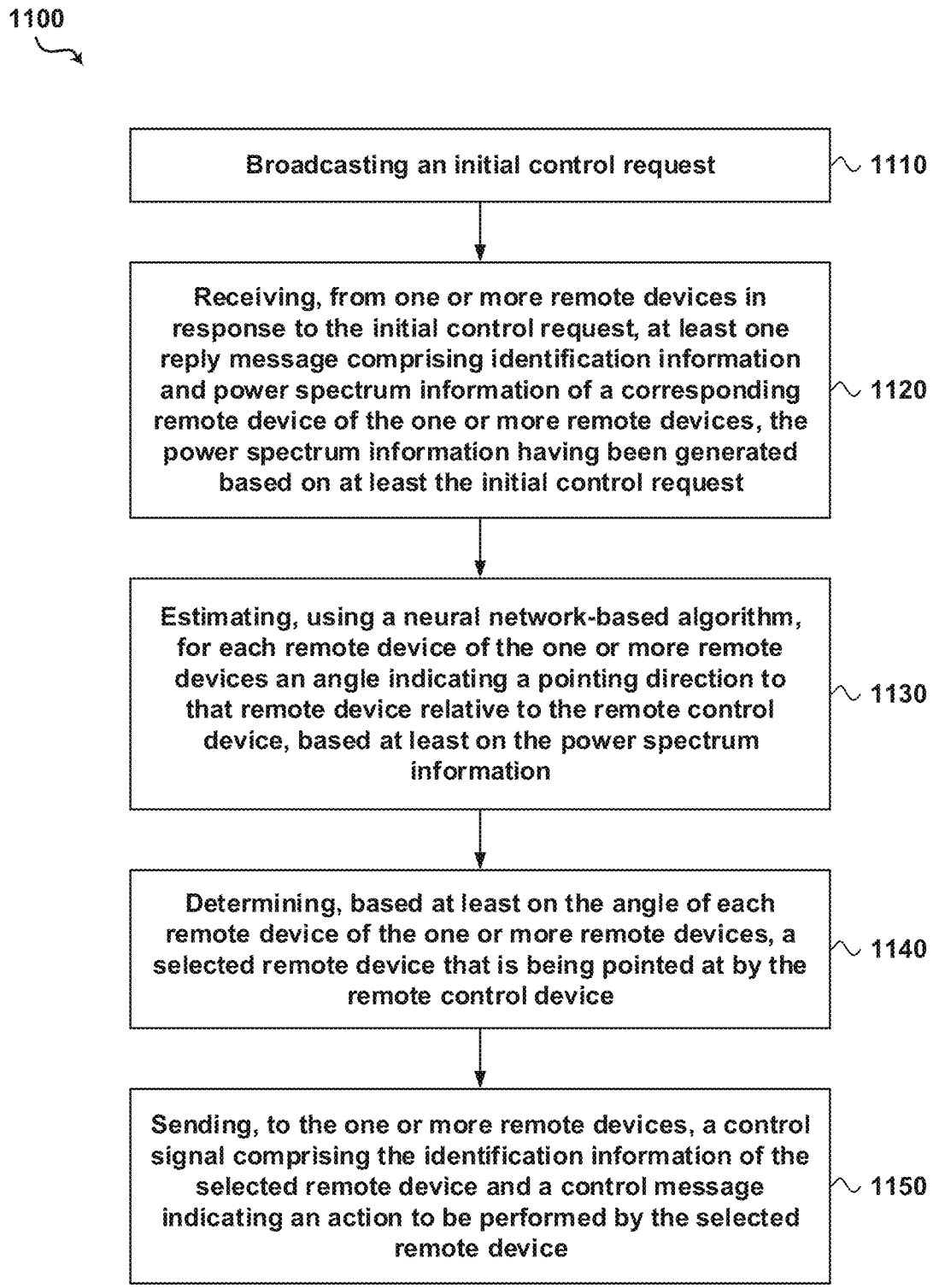
FIG. 11 depicts a flowchart of an example method of UWB remote control to be performed by a remote control device, in accordance with various aspects of the present disclosure.

Referring to FIG. 11, in operation, an apparatus 1000 may perform a method 1100 of UWB remote control to be performed by a remote control device. The method 1100 may be performed by the remote control device 210 (which may include the processor 120, the memory 130, and the storage component 140, and which may be the entire device 100 and/or include one or more components of the device 100, such as the input component 150, the output component 160, the communication interface 170, and/or the UWB remote control device component 183). The method 1100 may be performed by the remote control device 210 and/or the UWB remote control device component 183 in communication with the apparatus 1008 (e.g., a database, a server, a remote device 220, or another computing device).

At block 1110 of FIG. 11, the method 1100 may include broadcasting an initial control request. For example, in an aspect, the remote control device 210, the UWB remote control device component 183, and/or the broadcasting component 1010 may be configured to or may comprise means for broadcasting an initial control request 432.

For example, the broadcasting at block 1110 may include transmitting an UWB signal at a predetermined (e.g., known) power level, as described in further detail in reference to FIG. 5.

Further, for example, the broadcasting at block 1110 may be performed to cause the remote devices 220 to transmit a reply message with which the remote control device 210 may determine which remote device 220 is pointed to by the remote control device 210.

In a further optional or additional aspect, the method 1100 may include detecting that a change in a pointing orientation of the remote control device exceeds a predetermined threshold. For example, in such an optional or additional aspect, the remote control device 210, the UWB remote control device component 183, and/or the detecting component 1035 may be configured to or may comprise means for detecting that a change in a pointing orientation of the remote control device 210 exceeds a predetermined threshold. In such an optional or additional aspect, the broadcasting of the initial control request, at block 1110, may further include broadcasting, in response to the detecting that the change in the pointing orientation of the remote control device 210 exceeds the predetermined threshold, the initial control request 432.

In a further optional or additional aspect, the method 1100 may include obtaining a user input indicating the action to be performed by the selected remote device. For example, in such an optional or additional aspect, the remote control device 210, the UWB remote control device component 183, and/or the obtaining component 1040 may be configured to or may comprise means for obtaining a user input indicating the action to be performed by the selected remote device 220. In such an optional or additional aspect, the broadcasting of the initial control request, at block 1110, may further include broadcasting, in response to the obtaining of the user input, the initial control request 432.

At block 1120 of FIG. 11, the method 1100 may include receiving, from one or more remote devices in response to the initial control request, at least one reply message comprising identification information and power spectrum information of a corresponding remote device of the one or more remote devices, the power spectrum information having been generated based on at least the initial control request. For example, in an aspect, the remote control device 210, the UWB remote control device component 183, and/or the receiving component 1015 may be configured to or may comprise means for receiving, from one or more remote devices 220 in response to the initial control request 432, at least one reply message 434 comprising identification information and power spectrum information 418 of a corresponding remote device 220 of the one or more remote devices 220, the power spectrum information 418 having been generated based on at least the initial control request 432.

For example, the receiving at block 1120 may include receiving power spectrum information 418 that may comprise the power spectrum $G(\theta_k)$ value 425 and/or the coarse-grained estimated angle $\theta_k$ 526, as further described in reference to FIG. 8.

In some embodiments, the receiving at block 1120 may include receiving, from the one or more remote devices 220 in response to the initial control request 432, the at least one reply message 434, wherein the remote control device 210 has not performed a pairing procedure with the one or more remote devices 220.

Further, for example, the receiving at block 1120 may be performed to receive the power spectrum information that the remote control device 210 utilizes for estimating the angles indicating a pointing direction to the remote devices 220 relative to the remote control device 210.

At block 1130 of FIG. 11, the method 1100 may include estimating, using a neural network-based algorithm, for each remote device of the one or more remote devices an angle indicating a pointing direction to that remote device relative to the remote control device, based at least on the power spectrum information. For example, in an aspect, the remote control device 210, the UWB remote control device component 183, and/or the estimating component 1020 may be configured to or may comprise means for estimating, using a neural network-based algorithm 415, for each remote device 220 of the one or more remote devices 220 an angle indicating a pointing direction to that remote device 220 relative to the remote control device 210, based at least on the power spectrum information 418.

For example, the estimating at block 1130 may include calculating a probability distribution $\{P_A, P_B, \ldots, P_K\}$ based on the set of power spectrum information 425 from each remote device 220 (e.g., $\{\{G(\theta_A),\theta_A\}, \{G(\theta_B), \theta_B\}, \ldots, \{G(\theta_K), \theta_K\}\}$), as further described in reference to FIG. 8.

In some embodiments, the estimating at block 1130 may include calculating a probability distribution $\{P'_A, P'_B, \ldots, P'_K\}$ based on the set of coarse-grained angle estimates 414 corresponding to the remote devices 220 (e.g., $\{\theta_A, \theta'_B, \ldots, \theta'_K\}$), as further described in reference to FIG. 8.

In some optional or additional embodiments, the estimating at block 1130 may include estimating, using the neural network-based algorithm 415, for each remote device 220 of the one or more remote devices 220 the angle indicating the pointing direction to that remote device 220 in a 2D space or a 3D space relative to the remote control device 210, based at least on the power spectrum information 418.

Further, for example, the estimating at block 1130 may be performed to generate fine-grained angle estimations that may overcome interference, multipath, and/or other sources of noise that could result in erroneous and/or inaccurate spatial information (e.g., angle estimates) in related UWB-enabled devices. Thus, potentially providing an improved user experience when compared to related one-for-all remote control devices.

In a further optional or additional aspect, the method 1100 may include decoding, for each remote device of the one or more remote devices, respective signal phases of the at least one reply message. For example, in such an optional or additional aspect, the remote control device 210, the UWB remote control device component 183, and/or the decoding component 1045 may be configured to or may comprise means for decoding, for each remote device 220 of the one or more remote devices 220, respective signal phases 412 of the at least one reply message 434.

In such an optional or additional aspect, the method 1100 may include generating coarse-grained angle estimates for each remote device of the one or more remote devices, based at least on the respective signal phases. For example, in such an optional or additional aspect, the remote control device 210, the UWB remote control device component 183, and/or the generating component 1050 may be configured to or may comprise means for generating coarse-grained angle estimates 414 for each remote device 220 of the one or more remote devices 220, based at least on the respective signal phases 412.

In such an optional or additional aspect, the estimating of the angle, at block 1130, may further include estimating, using the neural network-based algorithm 415, for each remote device 220 of the one or more remote devices 220 the angle indicating the pointing direction to that remote device 220 relative to the remote control device 210, based at least on the power spectrum information 418 and the coarse-grained angle estimates 414.

At block 1140 of FIG. 11, the method 1100 may include determining, based at least on the angle of each remote device of the one or more remote devices, a selected remote device that is being pointed at by the remote control device. For example, in an aspect, the remote control device 210, the UWB remote control device component 183, and/or the determining component 1025 may be configured to or may comprise means for determining, based at least on the angle of each remote device 220 of the one or more remote devices 220, a selected remote device 220 that is being pointed at by the remote control device 210.

For example, the determining at block 1140 may include determining the selected remote device 220 based on the action to be performed by the selected remote device 220, as further described in reference to FIG. 4.

Further, for example, the determining at block 1140 may be performed to provide for the remote control device 210 to seamlessly switch control between different remote devices 220 as the pointing direction of the remote control device 210 is changed (e.g., by the user). Thus, potentially providing an improved user experience when compared to related one-for-all remote control devices.

At block 1150 of FIG. 11, the method 1100 may sending, to the one or more remote devices, a control signal comprising the identification information of the selected remote device and a control message indicating an action to be performed by the selected remote device. For example, in an aspect, the remote control device 210, the UWB remote control device component 183, and/or the sending component 1030 may be configured to or may comprise means for sending, to the one or more remote devices, a control signal 436 comprising the identification information of the selected remote device 220 and a control message indicating an action to be performed by the selected remote device 220.

For example, the sending at block 1150 may include sending, to the remote devices 220, a UWB control signal 436 comprising the ID information of the selected remote device and a control message indicating an action to be performed by the selected remote device 220, using the UWB TX component 417, as further described in reference to FIG. 4.

Further, for example, the sending at block 1150 may be performed to cause the selected remote device 220 to perform the action indicated by the user.

In a further optional or additional aspect, the method 1100 may include displaying a control UI corresponding to the selected remote device. For example, in such an optional or additional aspect, the remote control device 210, the UWB remote control device component 183, and/or the displaying component 1055 may be configured to or may comprise means for displaying a control UI corresponding to the selected remote device 220.

In a further optional or additional aspect, the method 1100 may further include obtaining, via the control UI, a user input indicating the action to be performed by the selected remote device. For example, in such an optional or additional aspect, the remote control device 210, the UWB remote control device component 183, and/or the obtaining component 1040 may be configured to or may comprise means for obtaining, via the control UI, a user input indicating the action to be performed by the selected remote device 220.

In a further optional or additional aspect, the method 1100 may include detecting that a change in a pointing orientation of the remote control device exceeds a predetermined threshold. For example, in such an optional or additional aspect, the remote control device 210, the UWB remote control device component 183, and/or the detecting component 1035 may be configured to or may comprise means for detecting that a change in a pointing orientation of the remote control device 210 exceeds a predetermined threshold.

In such an optional or additional aspect, the method 1100 may further include changing display of the control UI to another control UI corresponding to another selected remote device, in response to the change in the pointing orientation of the remote control device causing the another selected remote device to be determined as the selected remote device. For example, in such an optional or additional aspect, the remote control device 210, the UWB remote control device component 183, and/or the changing component 1060 may be configured to or may comprise means for changing display of the control UI to another control UI corresponding to another selected remote device 220, in response to the change in the pointing orientation of the remote control device 210 causing the another selected remote device 220 to be determined as the selected remote device 220.

In a further optional or additional aspect, the method 1100 may further include transmitting, to a particular remote device, a short preamble UWB signal at a predetermined power level, causing the particular remote device to calculate an environment-related parameter based on at least the short preamble UWB signal. For example, in such an optional or additional aspect, the remote control device 210, the UWB remote control device component 183, and/or the transmitting component 1065 may be configured to or may comprise means for transmitting, to a particular remote device 220, a short preamble UWB signal at a predetermined power level, causing the particular remote device 220 to calculate an environment-related parameter based on at least the short preamble UWB signal.

Figure 12:
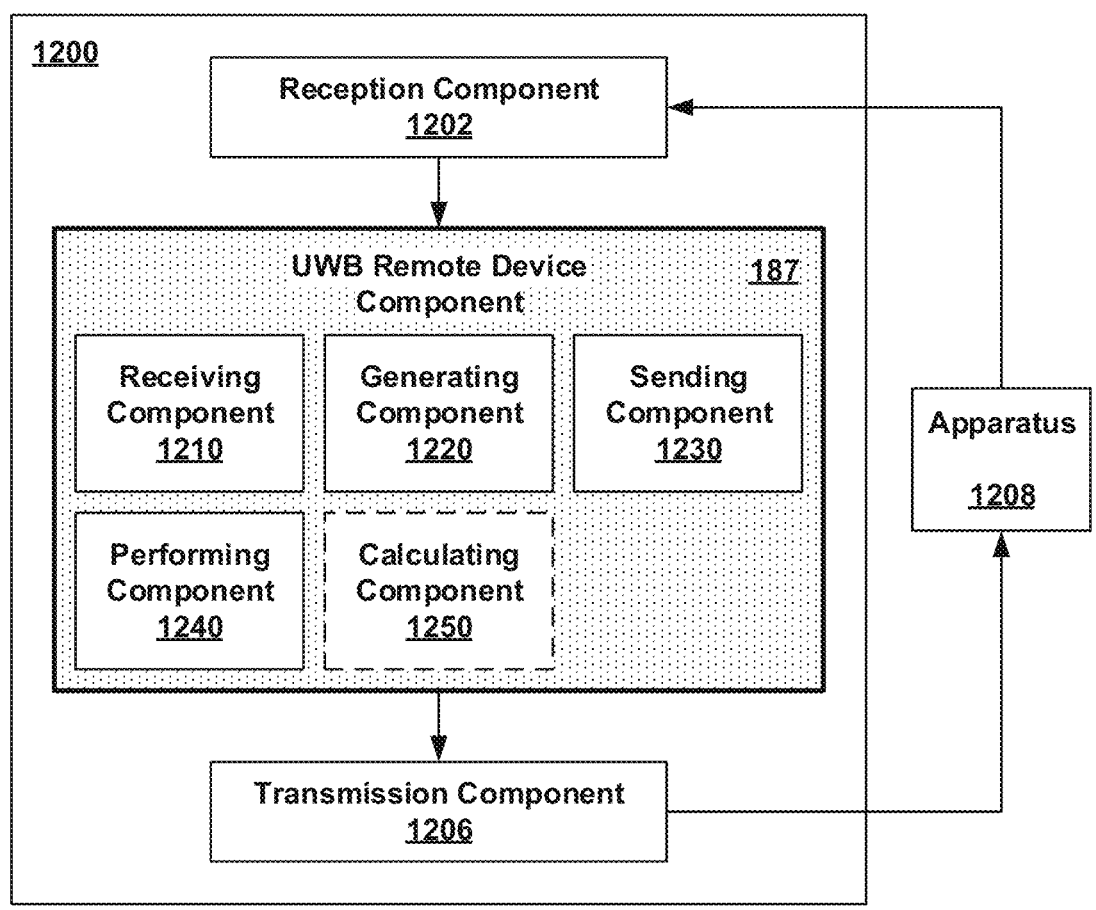
FIG. 12 illustrates a block diagram of an example apparatus, such as a remote device, for performing UWB remote control, in accordance with various aspects of the present disclosure.

FIG. 12 illustrates a block diagram of an example apparatus 1200 for UWB remote control to be performed by a remote device. The apparatus 1200 may be a computing device (e.g., device 100 of FIG. 1, remote device 220 of FIGS. 2-9) and/or a computing device may comprise the apparatus 1200. In some embodiments, the apparatus 1200 may comprise a reception component 1202 configured to receive communications (e.g., wired, wireless) from another apparatus (e.g., apparatus 1208), a UWB remote device component 187 configured to perform UWB remote control, and a transmission component 1206 configured to transmit communications (e.g., wired, wireless) to another apparatus (e.g., apparatus 1208). The components of the apparatus 1200 may be in communication with one another (e.g., via one or more buses or electrical connections). As shown in FIG. 12, the apparatus 1200 may be in communication with another apparatus 1208 (such as a database, a server, a remote control device 210, or another computing device) using the reception component 1202 and/or the transmission component 1206.

In some embodiments, the apparatus 1200 may be configured to perform one or more operations described herein in connection with FIGS. 1-9. Alternatively or additionally, the apparatus 1200 may be configured to perform one or more processes described herein, such as method 1300 of FIG. 13. In some embodiments, the apparatus 1200 may comprise one or more components of the device 100 described above in connection with FIGS. 1-9.

The reception component 1202 may receive communications, such as control information, data communications, or a combination thereof, from the apparatus 1208 (e.g., a database, a server, a remote control device 210, or another computing device). The reception component 1202 may provide received communications to one or more other components of the apparatus 1200, such as the UWB remote device component 187. In some embodiments, the reception component 1202 may perform signal processing on the received communications, and may provide the processed signals to the one or more other components. In some embodiments, the reception component 1202 may comprise the UWB RX component 422 described above in reference to FIG. 4. In some embodiments, the reception component 1202 may comprise one or more antennas, a receive processor, a controller/processor, a memory, or a combination thereof, of the device 100 described above in reference to FIG. 1.

The transmission component 1206 may transmit communications, such as control information, data communications, or a combination thereof, to the apparatus 1208 (e.g., a database, a server, a remote control device 210, or another computing device). In some embodiments, the UWB remote device component 187 may generate communications and may transmit the generated communications to the transmission component 1206 for transmission to the apparatus 1208. In some embodiments, the transmission component 1206 may perform signal processing on the generated communications, and may transmit the processed signals to the apparatus 1208. In some embodiments, the transmission component 1206 may comprise the UWB TX component 426 described above in reference to FIG. 4. In other embodiments, the transmission component 1206 may comprise one or more antennas, a transmit processor, a controller/processor, a memory, or a combination thereof, of the device 100 described above in reference to FIG. 1. In some embodiments, the transmission component 1206 may be co-located with the reception component 1202 such as in a transceiver and/or a transceiver component.

The UWB remote device component 187 may be configured to perform UWB remote control for a remote device. In some embodiments, the UWB remote device component 187 may include a set of components, such as a receiving component 1210 configured to receive an initial control request, a generating component 1220 configured to generate power spectrum information, a sending component 1230 configured to send a reply message, and a performing component 1240 configured to perform an action indicated by a control signal.

Alternatively or additionally, the UWB remote device component 187 may further include a calculating component 1250 configured to an calculate environment-related parameter.

In some embodiments, the set of components may be separate and distinct from the UWB remote device component 187. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
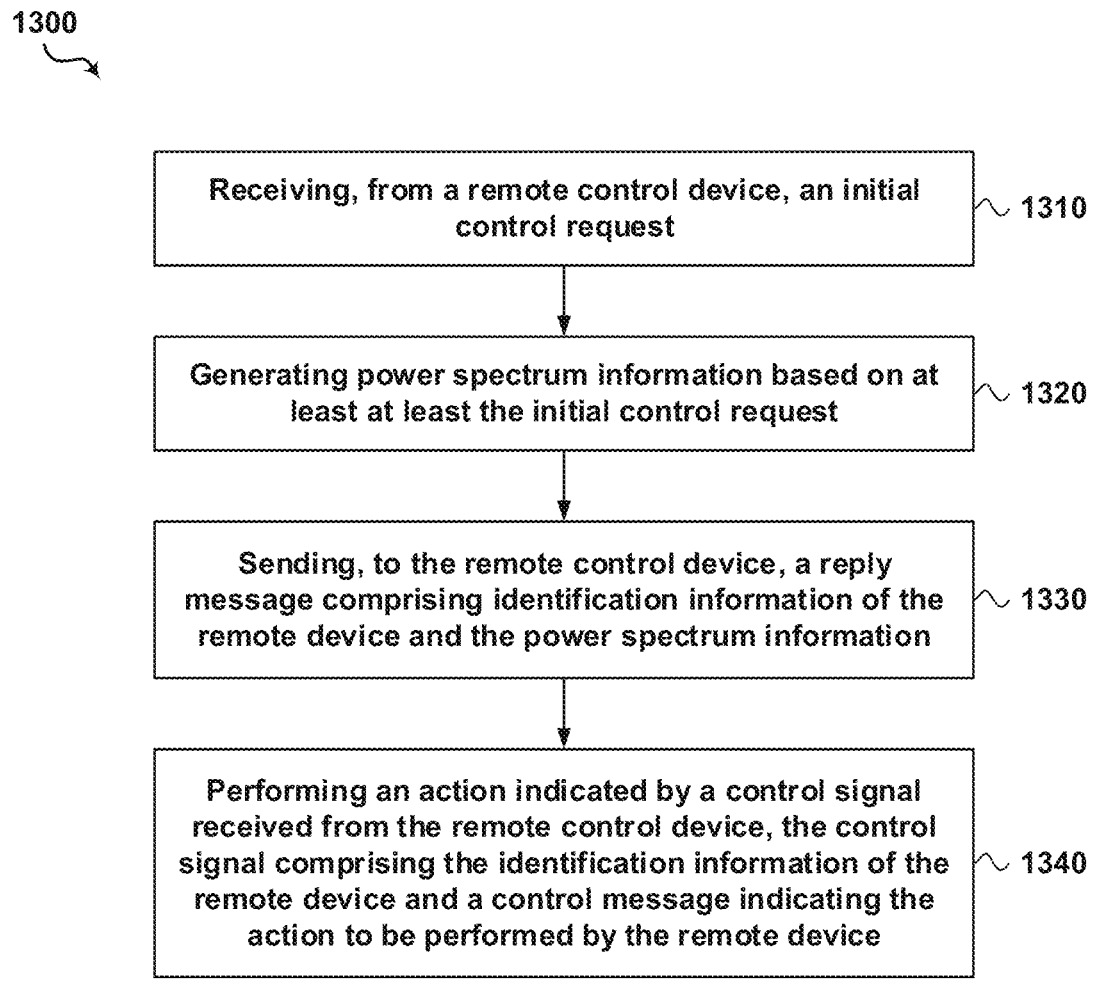
FIG. 13 depicts a flowchart of an example method of UWB remote control to be performed by a remote device, in accordance with various aspects of the present disclosure.

Referring to FIG. 13, in operation, an apparatus 1200 may perform a method 1300 of UWB remote control to be performed by a remote device. The method 1300 may be performed by the remote device 220 (which may include the processor 120, the memory 130, and the storage component 140, and which may be the entire device 100 and/or include one or more components of the device 100, such as the input component 150, the output component 160, the communication interface 170, and/or the UWB remote device component 187). The method 1300 may be performed by the remote device 220 and/or the UWB remote device component 187 in communication with the apparatus 1208 (e.g., a database, a server, a remote control device 210, or another computing device).

At block 1310 of FIG. 13, the method 1300 may include receiving, from a remote control device, an initial control request. For example, in an aspect, the remote device 220, the UWB remote device component 187, and/or the receiving component 1210 may be configured to or may comprise means for receiving, from a remote control device 210, an initial control request 432.

For example, the receiving at block 1310 may include receiving a UWB signal comprising the initial control request 432 that has been transmitted by the remote control device 210 at a predetermined (e.g., known) power level, as described in further detail in reference to FIG. 5.

Further, for example, the receiving at block 1310 may be performed to cause the remote device 220 to transmit a reply message with which the remote control device 210 may determine which remote device 220 is pointed to by the remote control device 210.

At block 1320 of FIG. 13, the method 1300 may include generating power spectrum information based on at least the initial control request. For example, in an aspect, the remote device 220, the UWB remote device component 187, and/or the generating component 1220 may be configured to or may comprise means for generating power spectrum information 425 based on at least the initial control request 432.

For example, the generating at block 1320 may include calculating a power difference 523 based on the received power level of the initial control request 432, the transmitted power level of the initial control request 432, and an environment-related parameter 514, as further described in reference to FIG. 5.

Further, for example, the generating at block 1320 may be performed to generate the power spectrum information that the remote control device 210 utilizes for estimating the angles indicating a pointing direction to the remote devices 220 relative to the remote control device 210.

In a further optional or additional aspect, the method 1300 may include receiving, from the remote control device, a short preamble UWB signal at a predetermined power level. For example, in such an optional or additional aspect, the remote control device 210, the UWB remote control device component 183, and/or the receiving component 1210 may be configured to or may comprise means for receiving, from the remote control device 210, a short preamble UWB signal at a predetermined power level.

In such an optional or additional aspect, the method 1300 may further include calculating an environment-related parameter based on at least the short preamble UWB signal. For example, in such an optional or additional aspect, the remote control device 210, the UWB remote control device component 183, and/or the calculating component 1250 may be configured to or may comprise means for calculating an environment-related parameter based on at least the short preamble UWB signal.

In such an optional or additional aspect, the generating of the power spectrum information, at block 1320, may further include generating the power spectrum information 425 based on at least the initial control request 432 and the environment-related parameter.

At block 1330 of FIG. 13, the method 1300 may include sending, to the remote control device, a reply message comprising identification information of the remote device and the power spectrum information. For example, in an aspect, the remote device 220, the UWB remote device component 187, and/or the sending component 1230 may be configured to or may comprise means for sending, to the remote control device 210, a reply message 434 comprising identification information of the remote device and the power spectrum information 425.

For example, the sending at block 1330 may include sending, to the remote control device 210, power spectrum information 418 that may comprise the power spectrum $G(\theta_k)$ value 425 and/or the coarse-grained estimated angle $\theta_k$ 526, as further described in reference to FIG. 8.

Further, for example, the sending at block 1330 may be performed to provide the power spectrum information that the remote control device 210 utilizes for estimating the angles indicating a pointing direction to the remote devices 220 relative to the remote control device 210.

At block 1340 of FIG. 13, the method 1300 may include performing an action indicated by a control signal received from the remote control device, the control signal comprising the identification information of the remote device and a control message indicating the action to be performed by the remote device. For example, in an aspect, the remote device 220, the UWB remote device component 187, and/or the performing component 1240 may be configured to or may comprise means for performing an action indicated by a control signal 436 received from the remote control device 210, the control signal 436 comprising the identification information of the remote device 220 and a control message indicating the action to be performed by the remote device 220.

For example, the performing at block 1340 may include determining whether the ID information indicated by the control signal 436 matches the ID information of the remote device 220, as further described in reference to FIG. 4.

Further, for example, the performing at block 1340 may be performed to cause the selected remote device 220 to perform the action indicated by the user.

Advantageously, one or more aspects presented herein provide for multiple manners generating fine-grained angle estimates that may overcome interference, multipath, and/or other sources of noise that could result in erroneous and/or inaccurate spatial information (e.g., angle estimates) in related UWB-enabled devices. Alternatively or additionally, one or more aspects presented herein provide for seamlessly switch control between different remote devices as the pointing direction of the remote control device is changed is 2D and/or 3D space. Thus, potentially providing an improved user experience when compared to related one-for-all remote control devices.

The following aspects are illustrative only and aspects thereof may be combined with aspects of other embodiments or teaching described herein, without limitation.

Aspect 1 is a method of UWB remote control to be performed by a remote control device. The method includes broadcasting an initial control request. The method further includes receiving, from one or more remote devices in response to the initial control request, at least one reply message including identification information and power spectrum information of a corresponding remote device of the one or more remote devices. The power spectrum information has been generated based on at least the initial control request. The method further includes estimating, using a neural network-based algorithm, for each remote device of the one or more remote devices an angle indicating a pointing direction to that remote device relative to the remote control device, based at least on the power spectrum information. The method further includes determining, based at least on the angle of each remote device of the one or more remote devices, a selected remote device that is being pointed at by the remote control device. The method further includes sending, to the one or more remote devices, a control signal including the identification information of the selected remote device and a control message indicating an action to be performed by the selected remote device.

In Aspect 2, the method of Aspect 1 may include receiving, from the one or more remote devices in response to the initial control request, the at least one reply message. The remote control device may not have performed a pairing procedure with the one or more remote devices.

In Aspect 3, the method of any of Aspects 1 or 2 may include detecting that a change in a pointing orientation of the remote control device exceeds a predetermined threshold. The broadcasting of the initial control request may include broadcasting, in response to the detecting that the change in the pointing orientation of the remote control device exceeds the predetermined threshold, the initial control request.

In Aspect 4, the method of any of Aspects 1 to 3 may include obtaining a user input indicating the action to be performed by the selected remote device. The broadcasting of the initial control request may include broadcasting, in response to the obtaining of the user input, the initial control request.

In Aspect 5, the method of any of Aspects 1 to 4 may include decoding, for each remote device of the one or more remote devices, respective signal phases of the at least one reply message. The method may further include generating coarse-grained angle estimates for each remote device of the one or more remote devices, based at least on the respective signal phases. The estimating of the angle may include estimating, using the neural network-based algorithm, for each remote device of the one or more remote devices the angle indicating the pointing direction to that remote device relative to the remote control device, based at least on the power spectrum information and the coarse-grained angle estimates.

In Aspect 6, the method of any of Aspects 1 to 5 may include displaying a control UI corresponding to the selected remote device.

In Aspect 7, the method of any of Aspects 1 to 6 may include obtaining, via the control UI, a user input indicating the action to be performed by the selected remote device.

In Aspect 8, the method of any of Aspects 1 to 7 may include detecting that a change in a pointing orientation of the remote control device exceeds a predetermined threshold. The method may further include changing display of the control UI to another control UI corresponding to another selected remote device, in response to the change in the pointing orientation of the remote control device causing the another selected remote device to be determined as the selected remote device.

In Aspect 9, the method of any of Aspects 1 to 8 may include estimating, using the neural network-based algorithm, for each remote device of the one or more remote devices the angle indicating the pointing direction to that remote device in a 2D space or a 3D space relative to the remote control device, based at least on the power spectrum information.

In Aspect 10, the method of any of Aspects 1 to 9 may include transmitting, to a particular remote device, a short preamble UWB signal at a predetermined power level, which may cause the particular remote device to calculate an environment-related parameter based on at least the short preamble UWB signal.

Aspect 11 is an apparatus for UWB remote control to be performed by a remote control device. The apparatus includes a memory storage storing computer-executable instructions, and a processor communicatively coupled to the memory storage. The processor is configured to execute the computer-executable instructions and cause the apparatus to perform one or more of the methods of any of Aspects 1 to 10.

Aspect 12 is an apparatus for UWB remote control to be performed by a remote control device including means for performing one or more of the methods of any of Aspects 1 to 10.

Aspect 13 is a non-transitory computer-readable storage medium storing computer-executable instructions for performing UWB remote control by a remote control device. The computer-executable instructions are configured, when executed by one or more processors of the remote control device, to cause the remote control device to perform one or more of the methods of any of Aspects 1 to 10.

Aspect 14 is a method of UWB remote control to be performed by a remote device. The method includes receiving, from a remote control device, an initial control request. The method further includes generating power spectrum information based on at least the initial control request. The method further includes sending, to the remote control device, a reply message including identification information of the remote device and the power spectrum information. The method further includes performing an action indicated by a control signal received from the remote control device. The control signal includes the identification information of the remote device and a control message indicating the action to be performed by the remote device.

In Aspect 15, the method of Aspect 14 may include receiving, from the remote control device, a short preamble UWB signal at a predetermined power level. The method may further include calculating an environment-related parameter based on at least the short preamble UWB signal. The generating of the power spectrum information may include generating the power spectrum information based on at least the initial control request and the environment-related parameter.

Aspect 16 is an apparatus for UWB remote control to be performed by a remote device. The apparatus includes a memory storage storing computer-executable instructions, and a processor communicatively coupled to the memory storage. The processor is configured to execute the computer-executable instructions and cause the apparatus to perform one or more of the methods of any of Aspects 14 to 15.

Aspect 17 is an apparatus for UWB remote control to be performed by a remote device including means for performing one or more of the methods of any of Aspects 14 to 15.

Aspect 18 is a non-transitory computer-readable storage medium storing computer-executable instructions for performing UWB remote control by a remote device. The computer-executable instructions are configured, when executed by one or more processors of the remote device, to cause the remote device to perform one or more of the methods of any of Aspects 14 to 15.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1 and 7) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc., that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method of ultra-wideband (UWB) remote control to be performed by a remote control device, comprising:
broadcasting an initial control request;
receiving, from one or more remote devices in response to the initial control request, at least one reply message comprising identification information and power spectrum information of a corresponding remote device of the one or more remote devices, the power spectrum information having been generated based on at least the initial control request;
estimating, using a neural network-based algorithm, for each remote device of the one or more remote devices an angle indicating a pointing direction to that remote device relative to the remote control device, based at least on the power spectrum information;
determining, based at least on the angle of each remote device of the one or more remote devices, a selected remote device that is being pointed at by the remote control device; and
sending, to the one or more remote devices, a control signal comprising the identification information of the selected remote device and a control message indicating an action to be performed by the selected remote device.

2. The method of claim 1, wherein the receiving of the at least one reply message comprises:
receiving, from the one or more remote devices in response to the initial control request, the at least one reply message, wherein the remote control device has not performed a pairing procedure with the one or more remote devices.

3. The method of claim 1, further comprising:
detecting that a change in a pointing orientation of the remote control device exceeds a predetermined threshold,
wherein the broadcasting of the initial control request comprises broadcasting, in response to the detecting that the change in the pointing orientation of the remote control device exceeds the predetermined threshold, the initial control request.

4. The method of claim 1, further comprising:
obtaining a user input indicating the action to be performed by the selected remote device,
wherein the broadcasting of the initial control request comprises broadcasting, in response to the obtaining of the user input, the initial control request.

5. The method of claim 1, further comprising:
decoding, for each remote device of the one or more remote devices, respective signal phases of the at least one reply message;
generating coarse-grained angle estimates for each remote device of the one or more remote devices, based at least on the respective signal phases,
wherein the estimating of the angle comprises estimating, using the neural network-based algorithm, for each remote device of the one or more remote devices the angle indicating the pointing direction to that remote device relative to the remote control device, based at least on the power spectrum information and the coarse-grained angle estimates.

6. The method of claim 1, further comprising:
displaying a control user interface (UI) corresponding to the selected remote device.

7. The method of claim 6, wherein the sending of the control signal comprises:
obtaining, via the control UI, a user input indicating the action to be performed by the selected remote device.

8. The method of claim 6, further comprising:
detecting that a change in a pointing orientation of the remote control device exceeds a predetermined threshold; and
changing display of the control UI to another control UI corresponding to another selected remote device, in response to the change in the pointing orientation of the remote control device causing the another selected remote device to be determined as the selected remote device.

9. The method of claim 1, wherein the estimating of the angle comprises:
estimating, using the neural network-based algorithm, for each remote device of the one or more remote devices the angle indicating the pointing direction to that remote device in a two dimensional (2D) space or a three dimensional (3D) space relative to the remote control device, based at least on the power spectrum information.

10. The method of claim 1, further comprising:
transmitting, to a particular remote device, a short preamble UWB signal at a predetermined power level, causing the particular remote device to calculate an environment-related parameter based on at least the short preamble UWB signal.

11. An apparatus for ultra-wideband (UWB) remote control to be performed by a remote control device, comprising:
a memory storage storing computer-executable instructions; and
a processor communicatively coupled to the memory storage, wherein the processor is configured to execute the computer-executable instructions and cause the apparatus to:
broadcast an initial control request;
receive, from one or more remote devices in response to the initial control request, at least one reply message comprising identification information and power spectrum information of a corresponding remote device of the one or more remote devices, the power spectrum information having been generated based on at least the initial control request;
estimate, using a neural network-based algorithm, for each remote device of the one or more remote devices an angle indicating a pointing direction to that remote device relative to the remote control device, based at least on the power spectrum information;
determine, based at least on the angle of each remote device of the one or more remote devices, a selected remote device that is being pointed at by the remote control device; and
send, to the one or more remote devices, a control signal comprising the identification information of the selected remote device and a control message indicating an action to be performed by the selected remote device.

12. The apparatus of claim 11, wherein to receive the at least one reply message comprises to:
receive, from the one or more remote devices in response to the initial control request, the at least one reply message, wherein the remote control device has not performed a pairing procedure with the one or more remote devices.

13. The apparatus of claim 11, wherein the processor is further configured to execute further computer-executable instructions and further cause the apparatus to:
detect that a change in a pointing orientation of the remote control device exceeds a predetermined threshold,
wherein to broadcast the initial control request comprises to broadcast, in response to detection that the change in the pointing orientation of the remote control device exceeds the predetermined threshold, the initial control request.

14. The apparatus of claim 11, wherein the processor is further configured to execute further computer-executable instructions and further cause the apparatus to:
obtain a user input indicating the action to be performed by the selected remote device,
wherein to broadcast the initial control request comprises to broadcast, in response to obtaining of the user input, the initial control request.

15. The apparatus of claim 11, wherein the processor is further configured to execute further computer-executable instructions and further cause the apparatus to:
decode, for each remote device of the one or more remote devices, respective signal phases of the at least one reply message;

generate coarse-grained angle estimates for each remote device of the one or more remote devices, based at least on the respective signal phases, wherein to estimate the angle comprises to estimate, using the neural network-based algorithm, for each remote device of the one or more remote devices the angle indicating the pointing direction to that remote device relative to the remote control device, based at least on the power spectrum information and the coarse-grained angle estimates.

16. The apparatus of claim 11, wherein the processor is further configured to execute further computer-executable instructions and further cause the apparatus to:

display a control user interface (UI) corresponding to the selected remote device.

17. The apparatus of claim 11, wherein to estimate of the angle comprises to:

estimate, using the neural network-based algorithm, for each remote device of the one or more remote devices the angle indicating the pointing direction to that remote device in a two dimensional (2D) space or a three dimensional (3D) space relative to the remote control device, based at least on the power spectrum information.

18. The apparatus of claim 11, wherein the processor is further configured to execute further computer-executable instructions and further cause the apparatus to:

transmit, to a particular remote device, a short preamble UWB signal at a predetermined power level, which causes the particular remote device to calculate an environment-related parameter based on at least the short preamble UWB signal.

* * * * *